(12) United States Patent
Trout et al.

(10) Patent No.: US 8,959,843 B2
(45) Date of Patent: *Feb. 24, 2015

(54) TELESCOPING FRAME SYSTEM FOR PORTABLE HOME OR OTHER STRUCTURE

(71) Applicant: Eco-Built Homes, LLC, Billings, MT (US)

(72) Inventors: Edward J. Trout, Billings, MT (US); Adam J. Trout, Billings, MT (US); Andy Breke, Billings, MT (US)

(73) Assignee: Eco-Built Homes, LLC, Billings, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,390

(22) Filed: May 18, 2013

(65) Prior Publication Data
US 2014/0130421 A1    May 15, 2014

Related U.S. Application Data

(63) Continuation-in-part of application No. 13/674,641, filed on Nov. 12, 2012, now Pat. No. 8,555,558.

(51) Int. Cl.
E04B 1/346 (2006.01)
E04B 7/16 (2006.01)
B60P 3/34 (2006.01)
E04B 1/343 (2006.01)

(52) U.S. Cl.
CPC .............. *E04B 1/34305* (2013.01); *B60P 3/34* (2013.01)
USPC ............................................................ 52/67

(58) Field of Classification Search
USPC .......... 52/6, 7, 8, 9, 10, 173.1, 64, 65, 67, 72; 296/165, 173, 175, 26.13, 26.14
See application file for complete search history.

(56) References Cited

U.S. PATENT DOCUMENTS

| 113,476 | A | 4/1871 | Williams |
|---|---|---|---|
| 2,469,752 | A | 5/1949 | Thomas |
| 2,606,057 | A | 8/1952 | Johnson |
| 2,636,773 | A | 4/1953 | Van Tassel |
| 2,886,856 | A | 5/1959 | Che |
| 2,902,312 | A | 9/1959 | Ferrera |
| 2,965,412 | A | 12/1960 | Henderson et al. |
| 3,060,521 | A | 10/1962 | Greco |
| 3,107,116 | A | 10/1963 | Meaker |
| 3,257,760 | A | 6/1966 | Calthorpe |
| 3,653,165 | A | 4/1972 | West |
| 3,719,386 | A | 3/1973 | Puckett et al. |
| 4,103,462 | A | 8/1978 | Freller |
| 4,133,571 | A | 1/1979 | Fillios |

(Continued)

*Primary Examiner* — William Gilbert
*Assistant Examiner* — Kyle Walraed-Sullivan
(74) *Attorney, Agent, or Firm* — Antoinette M. Tease

(57) ABSTRACT

A telescoping frame system comprising a non-telescoping frame with a longitudinal side, first and second attachment arms; a main arm that is parallel to the longitudinal side of the non-telescoping frame; a first pivot arm with a top surface that acts as a rail for a first roller wheel; a second pivot arm with a top surface that acts as a rail for a second roller wheel; and first and second brace arms that maintain each pivot arm at a ninety-degree angle to the longitudinal side of the non-telescoping frame when the first pivot arm is fully extended. The first and second pivot arms are pivotally attached to the first and second attachment arms, respectively. The first roller wheel is pivotally attached to a first end of the main arm, and the second roller wheel is pivotally attached to a second end of the main arm.

4 Claims, 39 Drawing Sheets

(56) References Cited

U.S. PATENT DOCUMENTS

| | | | |
|---|---|---|---|
| 4,277,919 A | 7/1981 | Artweger et al. | |
| 4,546,578 A | 10/1985 | Behrmann | |
| 4,711,257 A | 12/1987 | Kobayashi | |
| 4,780,996 A | 11/1988 | Julien, Jr. | |
| 4,986,037 A | 1/1991 | Jackson, Jr. | |
| 5,061,001 A | 10/1991 | Madden et al. | |
| 5,154,469 A | 10/1992 | Morrow | |
| 5,170,901 A | 12/1992 | Bersani | |
| 5,237,782 A * | 8/1993 | Cooper | 52/67 |
| 5,248,180 A | 9/1993 | Hussaini | |
| 5,297,368 A | 3/1994 | Okada | |
| 5,555,683 A * | 9/1996 | Schroeder | 52/200 |
| 5,570,924 A * | 11/1996 | Few et al. | 296/175 |
| 5,577,351 A | 11/1996 | Dewald, Jr. et al. | |
| 5,586,802 A | 12/1996 | Dewald, Jr. et al. | |
| 5,628,541 A | 5/1997 | Gardner | |
| 5,658,032 A | 8/1997 | Gardner | |
| 2,913,775 A | 10/1997 | Sailor | |
| 5,765,316 A | 6/1998 | Kavarsky | |
| 5,815,988 A | 10/1998 | Molina | |
| 5,921,033 A | 7/1999 | Molina | |
| 5,966,956 A | 10/1999 | Morris et al. | |
| 6,067,756 A | 5/2000 | Frerichs et al. | |
| 6,108,983 A | 8/2000 | Dewald, Jr. et al. | |
| 6,135,525 A | 10/2000 | Amann | |
| 6,293,612 B1 | 9/2001 | Crean | |
| 6,299,229 B1 | 10/2001 | Becenas Nieto | |
| 6,302,475 B1 | 10/2001 | Anderson | |
| 6,428,073 B1 | 8/2002 | Blodgett, Jr. | |
| 6,497,442 B1 | 12/2002 | Wacker | |
| 6,527,324 B2 | 3/2003 | McManus et al. | |
| 6,536,821 B1 | 3/2003 | Gardner | |
| 6,561,570 B2 | 5/2003 | Gehman et al. | |
| 6,604,327 B1 | 8/2003 | Reville | |
| 6,623,066 B2 | 9/2003 | Garceau et al. | |
| 6,637,160 B2 | 10/2003 | Brooks | |
| 6,637,804 B1 | 10/2003 | Crean | |
| 6,644,719 B2 | 11/2003 | Young, Sr. | |
| 6,679,543 B2 | 1/2004 | Messano | |
| 6,712,414 B2 | 3/2004 | Morrow | |
| 6,729,669 B2 | 5/2004 | McManus et al. | |
| 6,729,677 B2 | 5/2004 | Gurdjian et al. | |
| 6,772,563 B2 | 8/2004 | Kuhn | |
| 6,783,164 B2 | 8/2004 | Bortell | |
| 6,851,734 B2 | 2/2005 | Findley | |
| 6,854,787 B2 | 2/2005 | Gehman et al. | |
| 6,969,105 B2 | 11/2005 | Rincoe | |
| 6,983,567 B2 | 1/2006 | Ciotti | |
| 7,073,844 B2 | 7/2006 | Garceau et al. | |
| 7,100,967 B2 | 9/2006 | Shea | |
| 7,210,269 B2 | 5/2007 | Garceau et al. | |
| 7,229,123 B2 | 6/2007 | Kunz | |
| 7,290,372 B2 | 11/2007 | Aust et al. | |
| 7,300,086 B2 | 11/2007 | MacLean | |
| 7,418,802 B2 | 9/2008 | Sarine et al. | |
| 7,461,480 B1 | 12/2008 | Gardner | |
| 7,469,949 B2 | 12/2008 | Harder | |
| 7,527,313 B2 | 5/2009 | Peter | |
| 2001/0030437 A1 | 10/2001 | Hiebert et al. | |
| 2002/0047291 A1 | 4/2002 | Crean | |
| 2002/0074816 A1 | 6/2002 | McManus et al. | |
| 2002/0084663 A1 | 7/2002 | McManus et al. | |
| 2002/0089213 A1 | 7/2002 | Gehman et al. | |
| 2002/0180232 A1 | 12/2002 | Schneider et al. | |
| 2003/0014927 A1 | 1/2003 | Brooks | |
| 2003/0115808 A1 | 6/2003 | Morrow | |
| 2004/0094983 A1 | 5/2004 | Bortell | |
| 2004/0160074 A1 | 8/2004 | Shea | |
| 2004/0256874 A1 | 12/2004 | Rex | |
| 2005/0160682 A1 | 7/2005 | Quadrio | |
| 2005/0189777 A1 * | 9/2005 | Rasmussen | 296/26.01 |
| 2005/0230990 A1 | 10/2005 | Rincoe | |
| 2005/0284035 A1 | 12/2005 | DeOvando et al. | |
| 2006/0070306 A1 | 4/2006 | Lin | |
| 2006/0131912 A1 | 6/2006 | MacLean | |
| 2006/0237982 A1 | 10/2006 | Garceau et al. | |
| 2006/0254160 A1 | 11/2006 | Lee | |
| 2006/0273606 A1 | 12/2006 | Rasmussen | |
| 2007/0144078 A1 | 6/2007 | Frondelius | |
| 2007/0164580 A1 | 7/2007 | Peter | |
| 2007/0170740 A1 | 7/2007 | Di Franco | |
| 2007/0182185 A1 | 8/2007 | Nichols | |
| 2007/0194586 A1 | 8/2007 | Gardner | |
| 2008/0256878 A1 | 10/2008 | Berns et al. | |
| 2008/0263967 A1 | 10/2008 | Culveyhouse | |
| 2008/0265618 A1 | 10/2008 | Caderia et al. | |
| 2008/0315607 A1 | 12/2008 | Herson et al. | |
| 2009/0199492 A1 | 8/2009 | Gibson | |
| 2010/0024314 A1 | 2/2010 | Pope | |
| 2010/0024315 A1 | 2/2010 | Pope | |
| 2010/0024316 A1 | 2/2010 | Pope | |
| 2010/0024317 A1 | 2/2010 | Pope | |

* cited by examiner

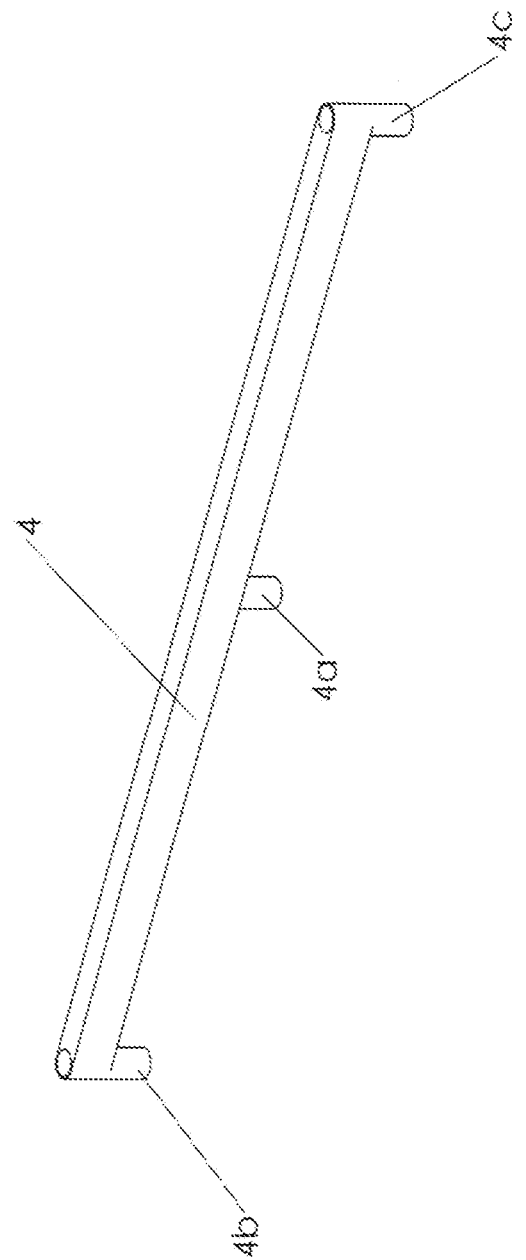

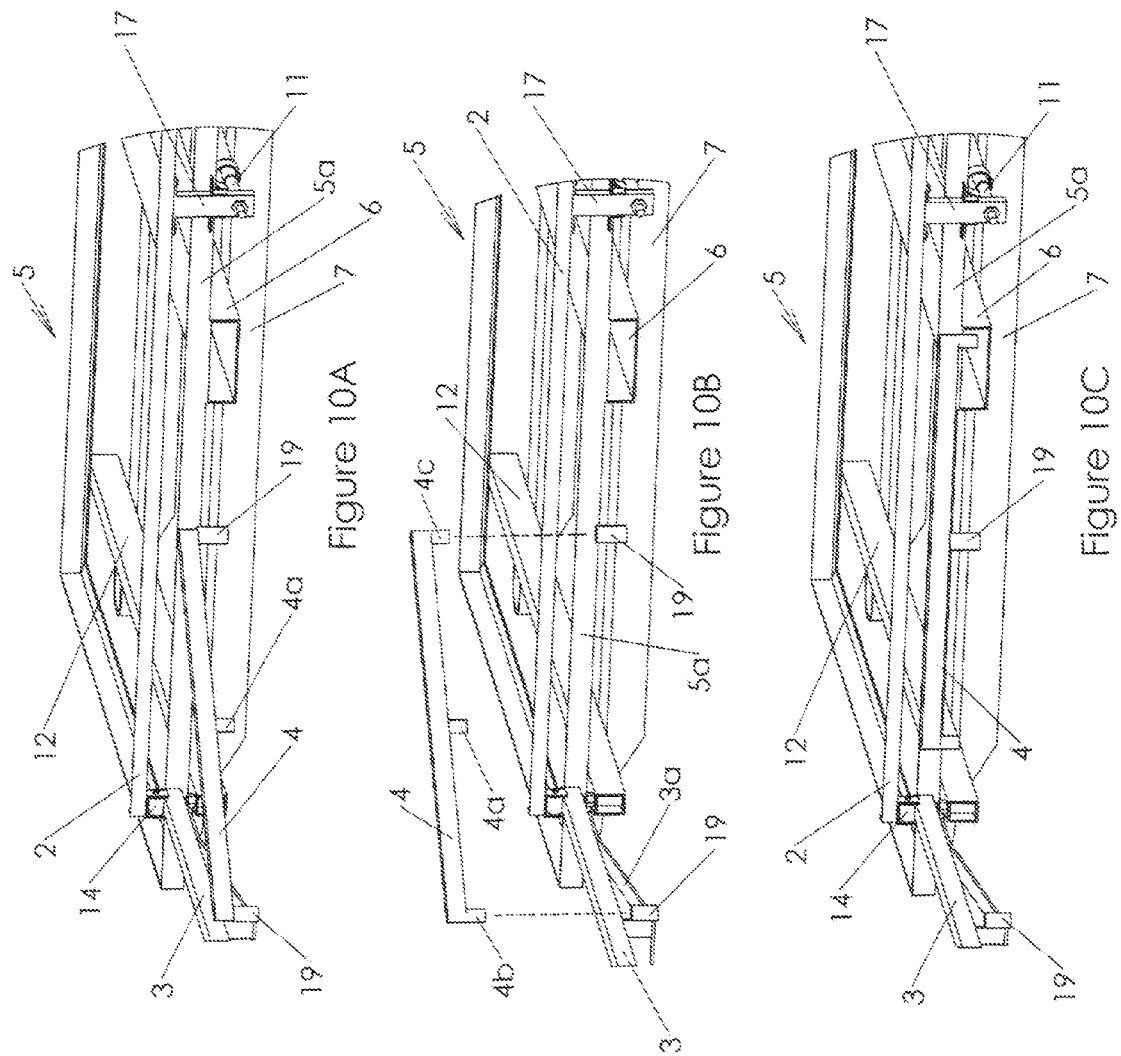

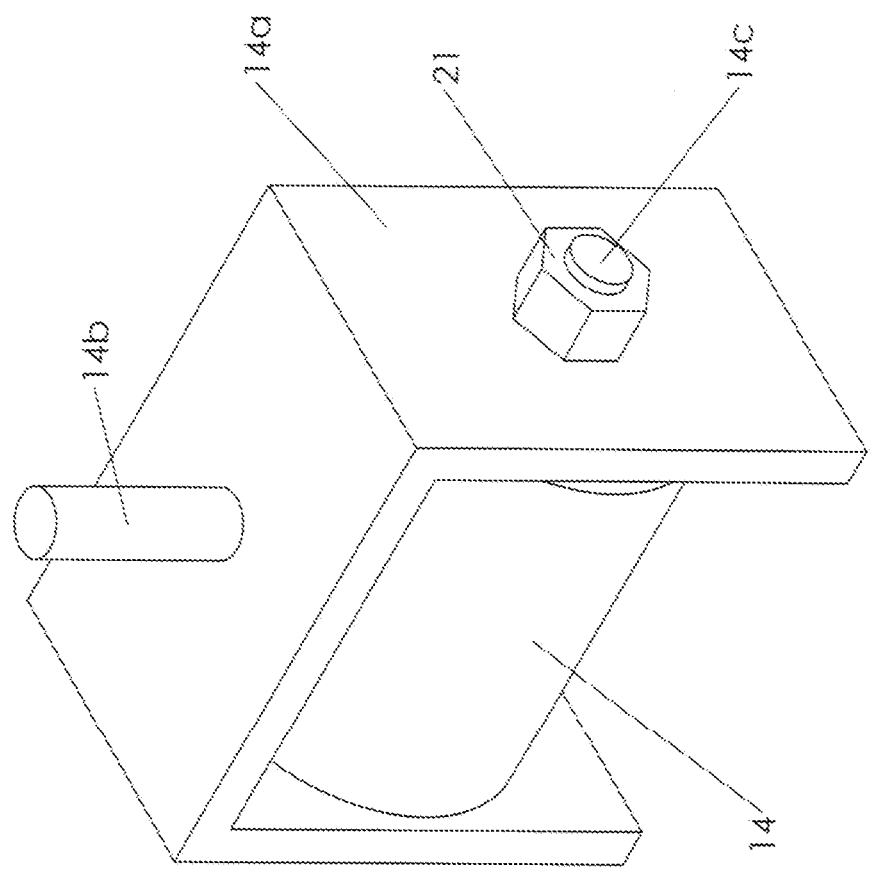

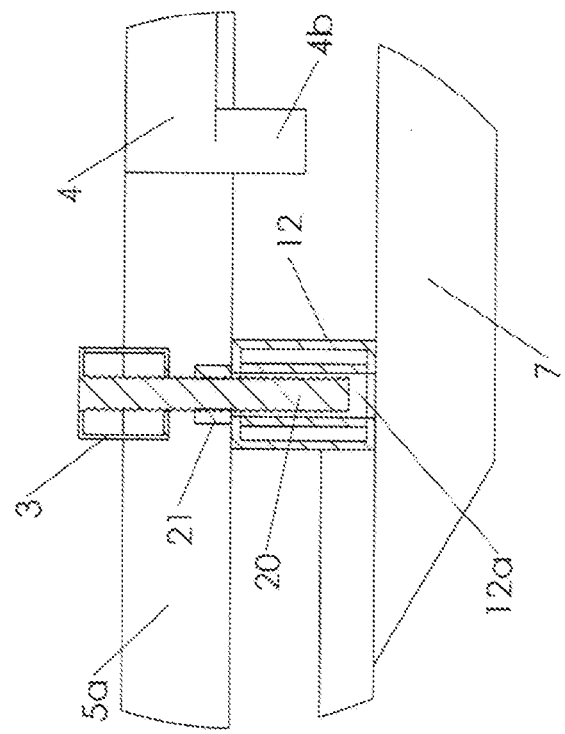
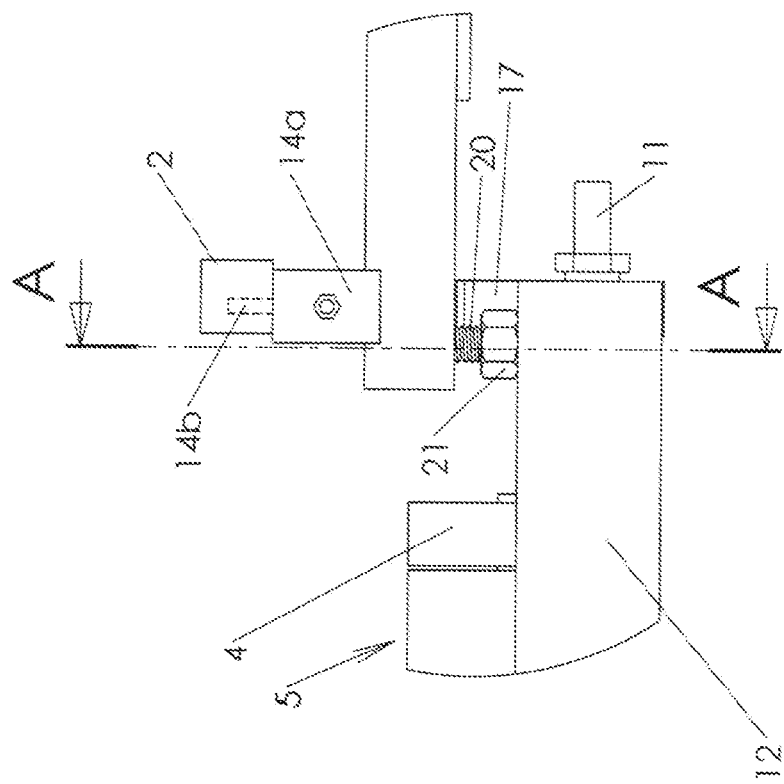

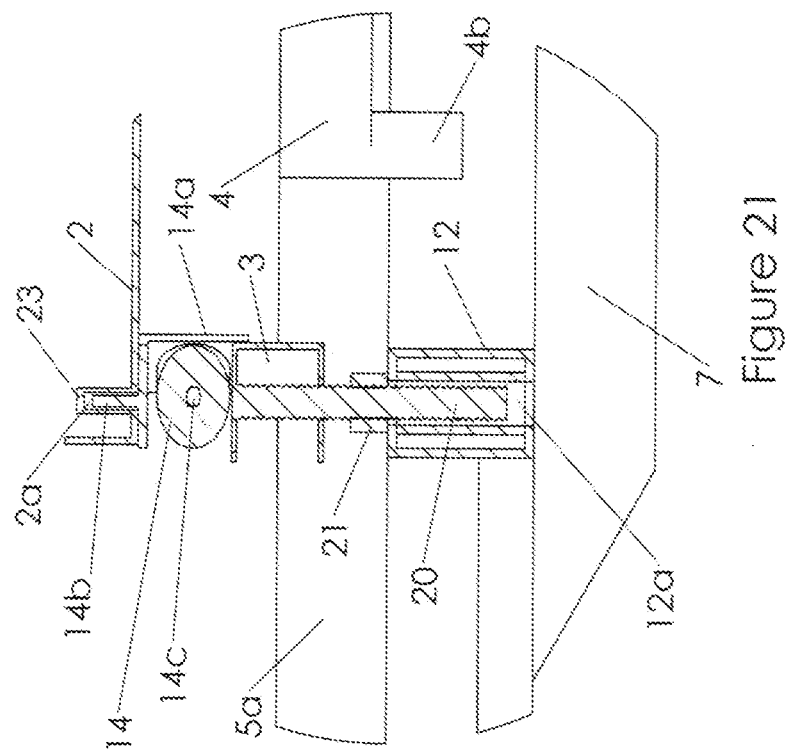
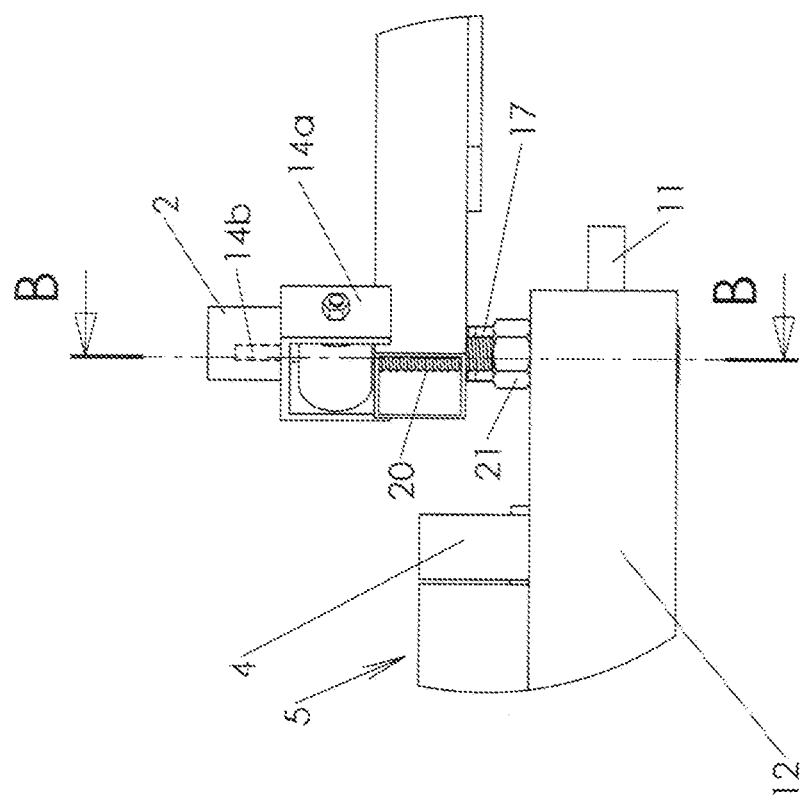

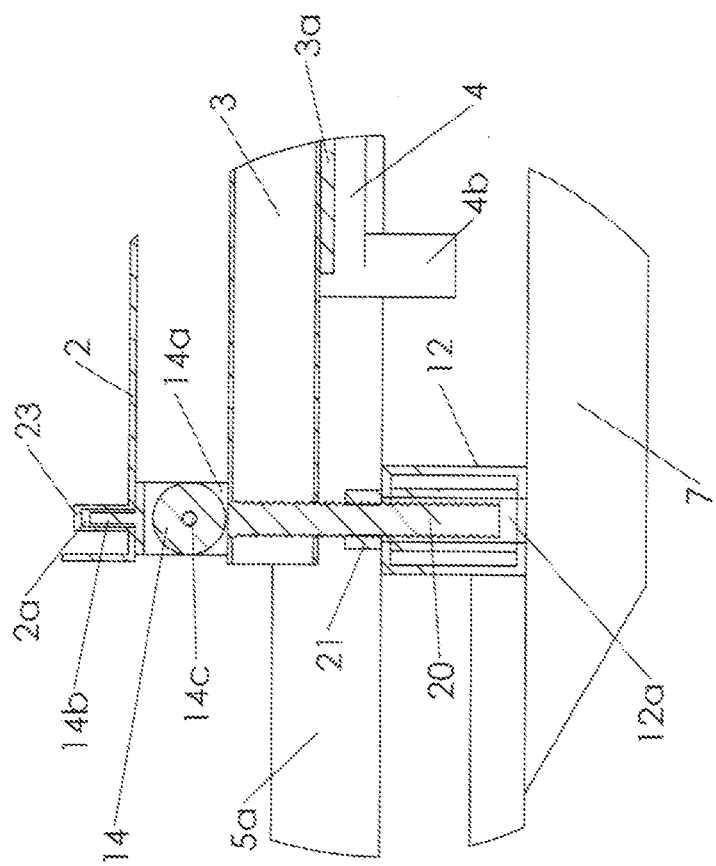
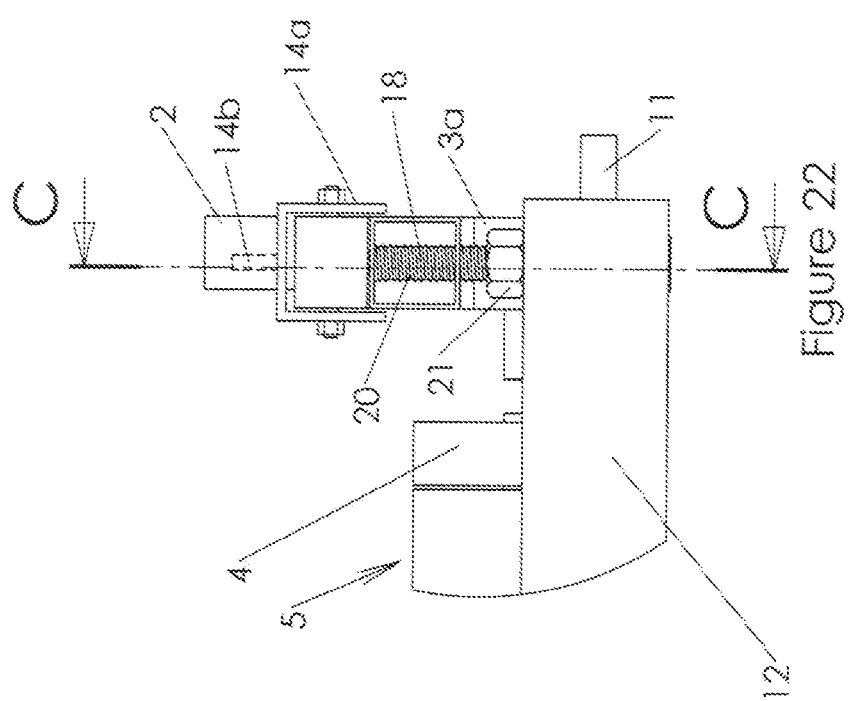

TELESCOPING FRAME SYSTEM FOR PORTABLE HOME OR OTHER STRUCTURE

CROSS-REFERENCE TO RELATED APPLICATION

This application is a continuation-in-part of U.S. patent application Ser. No. 13/674,641 filed on Nov. 12, 2012.

BACKGROUND OF THE INVENTION

1. Field of the Invention

The present invention relates generally to the field of portable structures, and more specifically, to a telescoping frame system for a portable home or other structure.

2. Description of the Related Art

Telescoping structures have existed for some time, but the present invention is unique in that it provides a telescoping frame with two roller wheels and two pivoting arms that hold the structure securely whether it is in an extended or retracted position. The telescoping frame of the present invention also tightens the structure, locking the second half of the structure into the first half when the structure is in a fully retracted position. In addition, the telescoping frame accommodates electric and communications cabling and can be used with a manual or electric actuation system.

Other examples of prior art systems for foldable, movable or collapsible structures include U.S. Pat. No. 113,476 (Williams, 1871); U.S. Pat. No. 3,060,521 (Greco, 1960); U.S. Pat. No. 3,719,386 (Puckett et al. 1973); and U.S. Pat. No. 5,297,368 (Okada, 1994). Additional references are cited in the Information Disclosure Statement submitted in connection with this application and are incorporated by reference herein.

BRIEF SUMMARY OF THE INVENTION

The present invention is a telescoping frame system comprising: a non-telescoping frame comprising a longitudinal side, a first attachment arm and a second attachment arm; a main arm that is parallel to the longitudinal side of the non-telescoping frame; a first pivot arm with a top surface that acts as a rail for a first roller wheel; a second pivot arm with a top surface that acts as a rail for a second roller wheel; a first brace arm that maintains the first pivot arm at a ninety-degree angle to the longitudinal side of the non-telescoping frame when the first pivot arm is fully extended; and a second brace arm that maintains the second pivot arm at a ninety-degree angle to the longitudinal side of the non-telescoping frame when the second pivot arm is fully extended; wherein the first pivot arm is pivotally attached to the first attachment arm, and the second pivot arm is pivotally attached to the second attachment arm; wherein the first roller wheel is pivotally attached to a first end of the main arm, and the second roller wheel is pivotally attached to a second end of the main arm; wherein when the roller wheels are moved toward the longitudinal side of the non-telescoping frame, the main arm is also moved toward the longitudinal side of the non-telescoping frame and remains parallel to the longitudinal side of the non-telescoping frame; and wherein when the main arm has been moved so that it is adjacent to the longitudinal side of the non-telescoping frame, the brace arms are removed to allow the pivot arms to pivot, and the pivot arms are pivoted inward and secured to a center bracket on the main arm.

In a preferred embodiment, the non-telescoping frame comprises a rectangular perimeter frame, one or more forklift pockets, one or more longitudinal skids, and a cable tray. Preferably, the non-telescoping frame comprises a first lateral end and a second lateral end, the first attachment arm is perpendicular to the longitudinal side of the non-telescoping frame and situated a first distance inside of the first lateral end of the non-telescoping frame, the second attachment arm is perpendicular to the longitudinal side of the non-telescoping frame and situated a second distance inside of the second lateral end of the non-telescoping frame, and the first distance is roughly equal to the second distance. The present invention preferably further comprises an actuator that extends laterally through the non-telescoping frame, the actuator having a first end and a second end, wherein the first end of the actuator is secured to the center bracket, and the second end of the actuator is connected to a motor.

In a preferred embodiment, the first and second pivot arms each comprises a distal end, and the distal end of each pivot arm comprises an upwardly extending stop that prevents the roller wheel from traveling off the distal end of the pivot arm. Preferably, the main arm further comprises a saddle bracket for installing a structure on top of the main arm.

In yet another preferred embodiment, each of the first and second brace arms comprises a first extension on a first end of the brace arm, a second extension in roughly the center of the brace arm, and a third extension on a second end of the brace arm, the first pivot arm having an inside surface and a center, the invention further comprising a first receptacle secured to the inside surface of the first pivot arm at roughly the center of the first pivot arm, the second pivot arm having an inside surface and a center, the invention further comprising a second receptacle secured to the inside surface of the second pivot arm at roughly the center of the second pivot arm; the longitudinal side of the non-telescoping frame having an outside edge, a center, a first end and a second end, the invention further comprising a third receptacle secured to the outside edge of the longitudinal side of the non-telescoping frame between the center of the longitudinal edge and a first end of the longitudinal side and a fourth receptacle secured to the outside edge of the longitudinal side of the non-telescoping frame between the center of the longitudinal side and a second end of the longitudinal side; wherein each of the first, second, third and fourth receptacles is configured to accept one of the first, second and third extensions of the first and second brace arms.

In a preferred embodiment, the pivot arm has a vertical position relative to the attachment arm, and the vertical position of the pivot arm relative to the attachment arm is adjustable. In one embodiment, the invention further comprises a power actuation system for moving the main arm toward and away from the longitudinal side of the non-telescoping frame. In another embodiment, the invention further comprises a manual actuation system for moving the main arm toward and away from the longitudinal side of the non-telescoping frame.

In an alternate embodiment, the present invention is a telescoping frame system comprising: a non-telescoping frame comprising a longitudinal side, a first attachment arm, a second attachment arm, and a third attachment arm; a main arm that is parallel to the longitudinal side of the non-telescoping frame; a first pivot arm with a top surface that acts as a rail for a first roller wheel, a second pivot arm with a top surface that acts as a rail for a second roller wheel, and a third pivot arm with a top surface that acts as a rail for a third roller wheel; a first brace arm that maintains the first pivot arm at a ninety-degree angle to the longitudinal side of the non-telescoping frame when the first pivot arm is fully extended, a second brace arm that maintains the second pivot arm at a ninety-degree angle to the longitudinal side of the non-telescoping frame when the second pivot arm is fully extended, and a third brace arm that maintains the third pivot arm at a ninety-degree angle to the longitudinal side of the non-telescoping frame when the third pivot arm is fully extended; wherein the first pivot arm is pivotally attached to the first attachment arm, the second pivot arm is pivotally attached to the second attachment arm, and the third pivot arm is pivotally attached to the third attachment arm; wherein the first roller wheel is pivotally attached to a first end of the main arm, the second roller wheel is pivotally attached to a center of the main arm, and the third roller wheel is pivotally attached to a second end of the main arm; wherein when the roller wheels are moved toward the longitudinal side of the non-telescoping frame, the main arm is also moved toward the longitudinal side of the non-telescoping frame and remains parallel to the longitudinal side of the non-telescoping frame; and wherein when the main arm has been moved so that it is adjacent to the longitudinal side of the non-telescoping frame, the brace arms are removed to allow the pivot arms to pivot, and the pivot arms are pivoted inward and secured to the main arm.

In another alternate embodiment, the present invention is a telescoping frame system comprising: a non-telescoping frame comprising a longitudinal side, a first attachment arm, a second attachment arm, a third attachment arm, and a fourth attachment arm; a main arm that is parallel to the longitudinal side of the non-telescoping frame; a first pivot arm with a top surface that acts as a rail for a first roller wheel, a second pivot arm with a top surface that acts as a rail for a second roller wheel, a third pivot arm with a top surface that acts as a rail for a third roller wheel, and a fourth pivot arm with a top surface that acts as a rail for a fourth roller wheel; a first brace arm that maintains the first pivot arm at a ninety-degree angle to the longitudinal side of the non-telescoping frame when the first pivot arm is fully extended, a second brace arm that maintains the second pivot arm at a ninety-degree angle to the longitudinal side of the non-telescoping frame when the second pivot arm is fully extended, a third brace arm that maintains the third pivot arm at a ninety-degree angle to the longitudinal side of the non-telescoping frame when the third pivot arm is fully extended, and a fourth brace arm that maintains the fourth pivot arm at a ninety-degree angle to the longitudinal side of the non-telescoping frame when the fourth pivot arm is fully extended; wherein the first pivot arm is pivotally attached to the first attachment arm, the second pivot arm is pivotally attached to the second attachment arm, the third pivot arm is pivotally attached to the third attachment arm, and the fourth pivot arm is pivotally attached to the fourth attachment arm; wherein the first roller wheel is pivotally attached to a first end of the main arm, the second roller wheel is pivotally attached to the main arm at a point between the first end of the main arm and a second end of the main arm, the third roller wheel is pivotally attached to the main arm at a point between the first end of the main arm and the second end of the main arm, and the fourth roller wheel is pivotally attached to the second end of the main arm; wherein when the roller wheels are moved toward the longitudinal side of the non-telescoping frame, the main arm is also moved toward the longitudinal side of the non-telescoping frame and remains parallel to the longitudinal side of the non-telescoping frame; and wherein when the main arm has been moved so that it is adjacent to the longitudinal side of the non-telescoping frame, the brace arms are removed to allow the pivot arms to pivot, and the pivot arms are pivoted inward and secured to the main arm.

In a preferred embodiment, the invention further comprises a power actuation system for moving the main arm toward and away from the longitudinal side of the non-telescoping frame. In another preferred embodiment, the invention further comprises a manual actuation system for moving the main arm toward and away from the longitudinal side of the non-telescoping frame.

BRIEF DESCRIPTION OF THE DRAWINGS

FIG. 10 is a perspective view of the brace arm of the present invention.

FIG. 10A is a detail perspective view of the brace arm in a brace position.

FIG. 10B is a detail perspective view of the brace arm removed from the brace position.

FIG. 10C is a detail perspective view of the brace arm in a transport position.

FIG. 17 is a perspective view of the roller wheel and roller wheel bracket of the present invention.

FIG. 18 is a detail side view of the pivot point between the attachment arm and the pivot arm shown with the pivot arm fully extended.

FIG. 19 is a section view of the pivot point shown in FIG. 18.

FIG. 20 is a detail side view of the pivot point between the attachment arm and the pivot arm shown with the pivot arm at a forty-five (45)-degree angle relative to the main arm.

FIG. 21 is a section view of the pivot point shown in FIG. 20.

FIG. 22 is a detail side view of the pivot point between the attachment arm and the pivot arm shown with the pivot arm fully retracted/stowed.

FIG. 23 is a section view of the pivot point shown in FIG. 22.

REFERENCE NUMBERS

Figure 1:
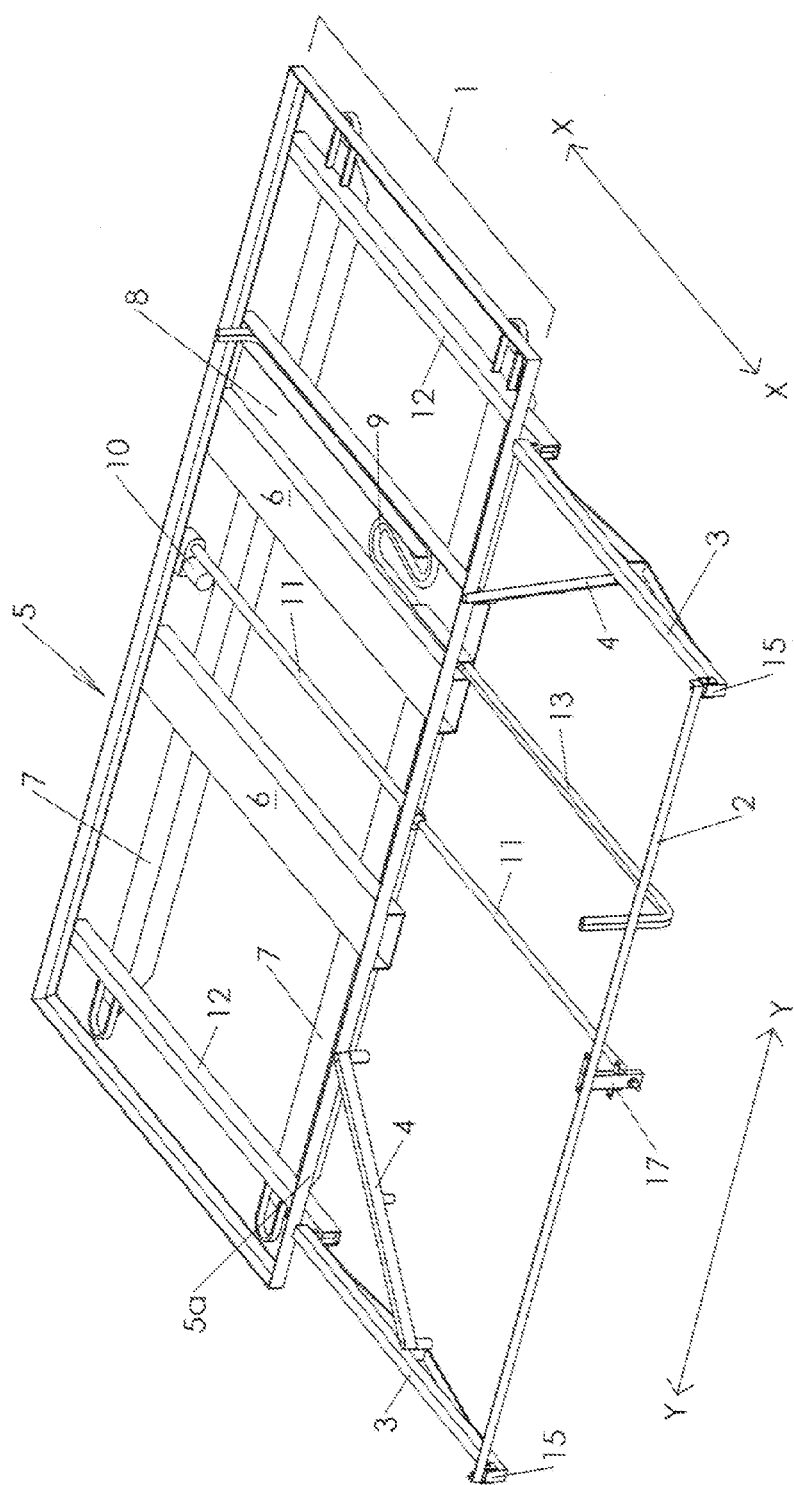
FIG. 1 is a first top perspective view of the present invention shown with the main arm in a fully extended position.

1 Non-telescoping frame
2 Main arm
2a Hole (in main arm)
3 Pivot arm
3a Under-support (of pivot arm)
4 Brace arm
4a Center extension (of brace arm)
4b First end extension (of brace arm)
4c Second end extension (of brace arm)
5 Rectangular perimeter frame
5a Longitudinal side (of perimeter frame)
6 Forklift pocket
7 Skid
8 Cable tray
9 Cabling
10 Motor
11 Linear actuator
12 Attachment arm
12a Hole (in attachment arm)
13 Cable tubing
14 Roller wheel
14a Roller wheel bracket
14b Upwardly extending pin
14c Axle (of roller wheel)
15 Stop
16 Saddle bracket
17 Center bracket
17a Supporting bracket
18 Pin/bolt
19 Receptacle
20 Threaded bolt
21 Nut
22 Sleeve (on attachment arm)
23 Sleeve (on main arm)
24 Lateral tube
25 Lateral rectangular conduit

DETAILED DESCRIPTION OF INVENTION

FIG. 1 is a first top perspective view of the present invention shown with the main arm in a fully extended position. As shown in this figure, the invention comprises a non-telescoping frame 1, a main arm 2, two pivot arms 3, and two brace arms 4. The non-telescoping frame preferably comprises a rectangular perimeter frame 5, one or more forklift pockets 6, one or more longitudinal skids 7, and a cable tray 8. The purpose of the cable tray 8 is to hold the electric and communications cabling 9. As used herein, the term "rectangular" also means square.

Figure 27:
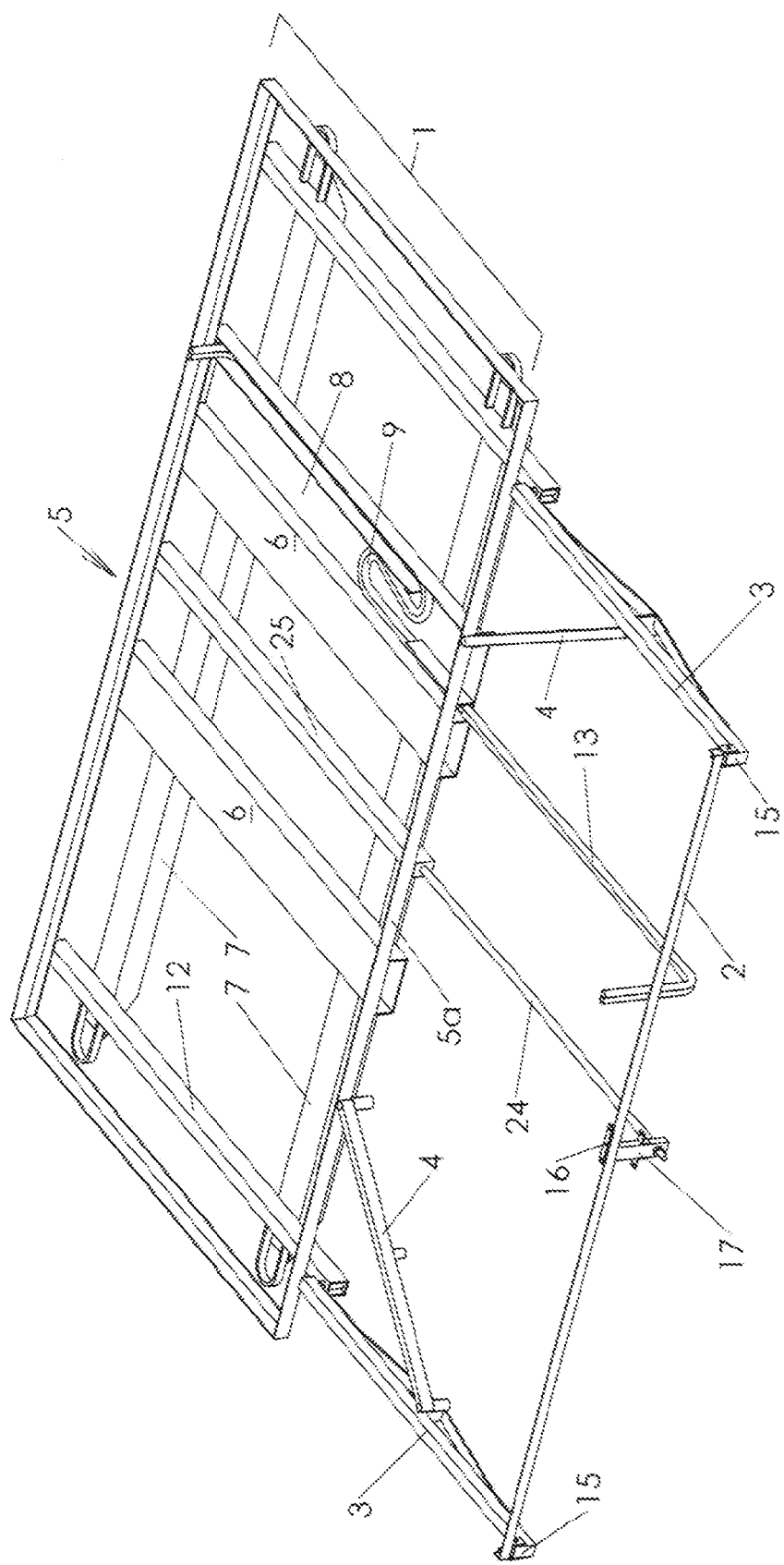
FIG. 27 is a first top perspective view of the present invention shown with the main arm in a fully extended position and with a manual actuation system.
Figure 28:
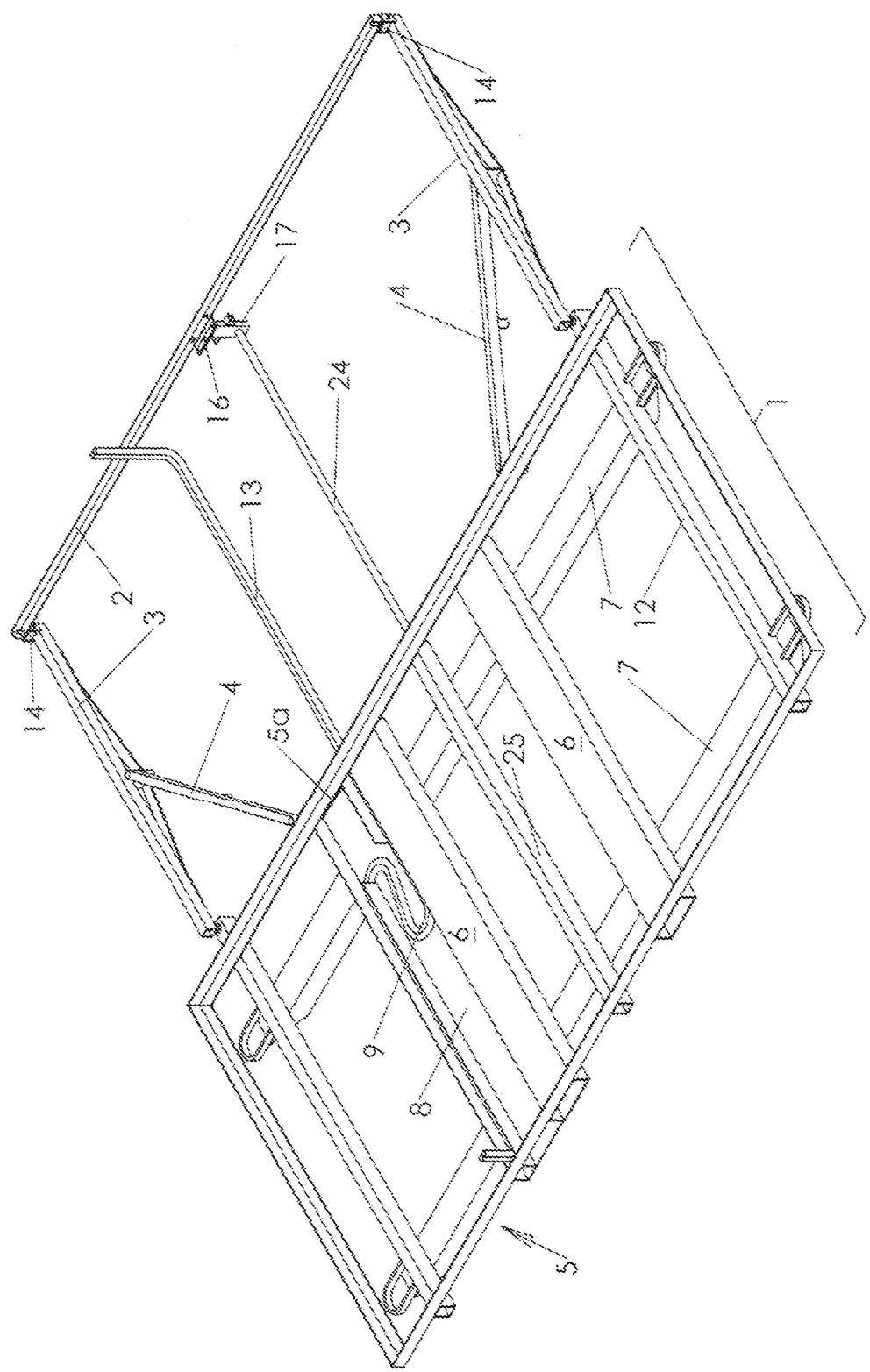
FIG. 28 is a second top perspective view of the present invention shown with the main arm in a fully extended position and with a manual actuation system.
Figure 29:
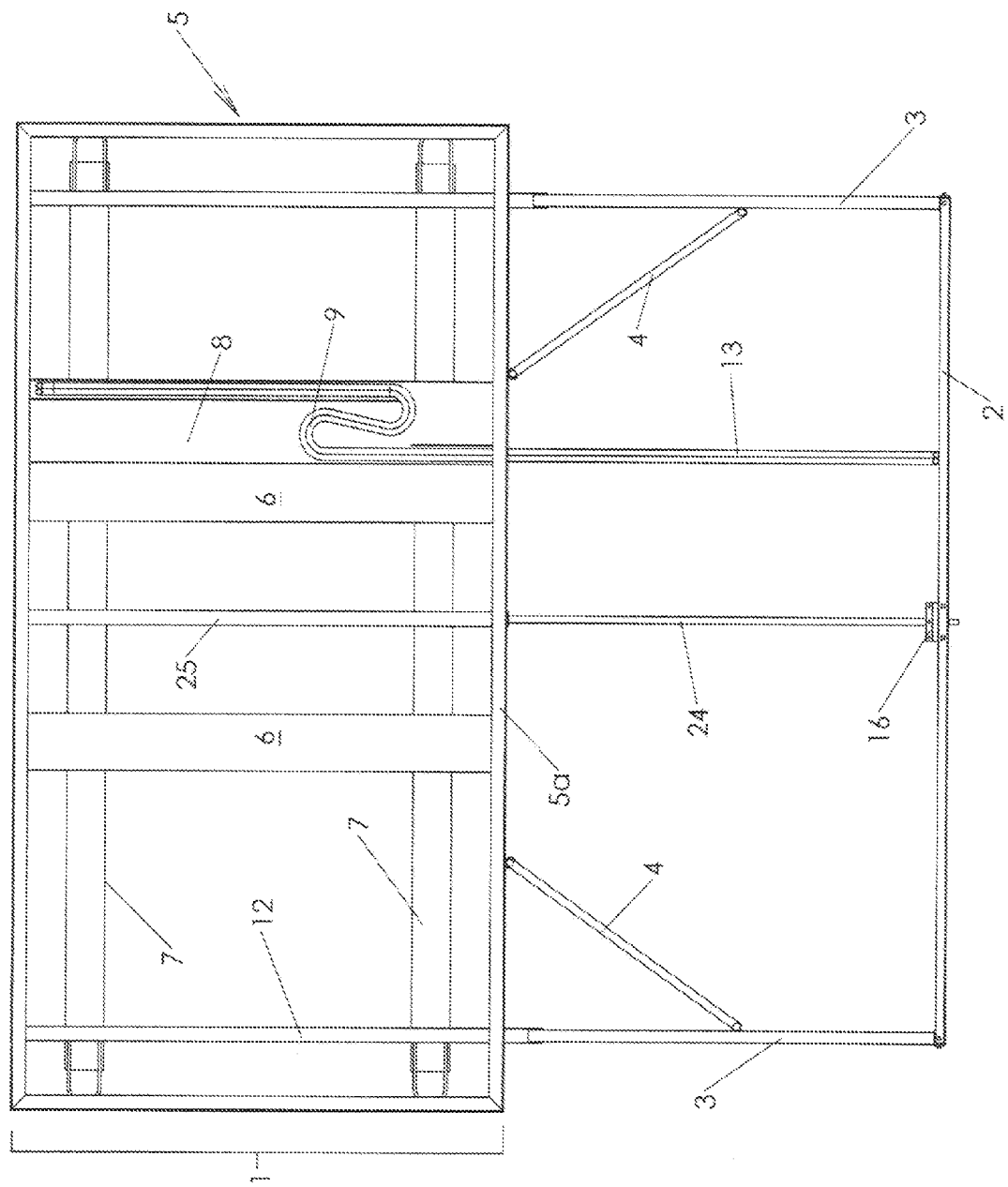
FIG. 29 is a top view of the present invention shown with the main arm in a fully extended position and with a manual actuation system.

The embodiment shown in FIG. 1 incorporates a power (motor) actuation system. The power actuation system comprises an electric motor 10 with a linear actuator 11. In a preferred embodiment, the inventors used a custom-built linear actuator specifically manufactured by Venture Mfg. Co. (of Dayton, Ohio) for the present invention. The actuator 11 is used to push the main arm 2 out (i.e. extend it) and pull it in (i.e. retract it). An alternate embodiment in which a manual actuation system is used is shown in FIGS. 27-29.

The non-telescoping frame 1 further comprises two attachment arms 12, which provide an attachment point for the pivot arms 3, as shown in detail in subsequent figures. The two attachments arms 12 are oriented laterally (relative to the non-telescoping frame 1), and they are each situated an equal distance inside of the lateral ends of the perimeter frame 5. The skids 7 are preferably oriented longitudinally (relative to the non-telescoping frame 1), and they are situated underneath the rectangular perimeter frame 5. The skids 7 are used to transport the structure that is installed on top of the present invention. The forklift pockets 6 are preferably oriented laterally (relative to the non-telescoping frame 1), and are situated between the rectangular perimeter frame 5 and the skids 7. Similarly, the attachment arms 12 are preferably situated between the rectangular perimeter frame 5 and the skids 7. The purpose of the forklift pockets 6 is to allow a forklift to lift the frame (and whatever structure is installed upon it).

As used herein, the term "lateral" or "laterally" means in the direction indicated with X's on FIG. 1. The term "longitudinal" or "longitudinally" means in the direction indicated with Y's on FIG. 1.

In a preferred embodiment, the actuator 11 extends laterally through the center of the non-telescoping frame 1. The actuator 11 is secured on one end (the end opposite the motor 10) to a center bracket 17 that is also attached to the main arm 2 and that extends downward from the center of the main arm 2. The cabling 9 is protected by cable tubing 13 that extends laterally between the non-telescoping frame 1 and the main arm 2. The cable tubing 13 extends laterally from the cable tray 8, which can be situated anywhere on the non-telescoping frame 1.

The main arm 2 is parallel to the longitudinal sides of the perimeter frame 5. The main arm 2 is attached at its center to the center bracket 17. On either end of the main arm 2 is a roller wheel 14 (see FIG. 2) that travels along (in a lateral direction) the top surface of the pivot arm 3 (which acts as a rail) when the pivot arm 3 is fully extended (as shown in FIGS. 1-9). The two brace arms 4 maintain the pivot arms 3 at ninety (90)-degree angles to the longitudinal side 5a of the perimeter frame 5. The present invention is not limited to any particular shape of the non-rectangular frame, as long as it has at least one longitudinal side 5a that is straight.

Figure 2:
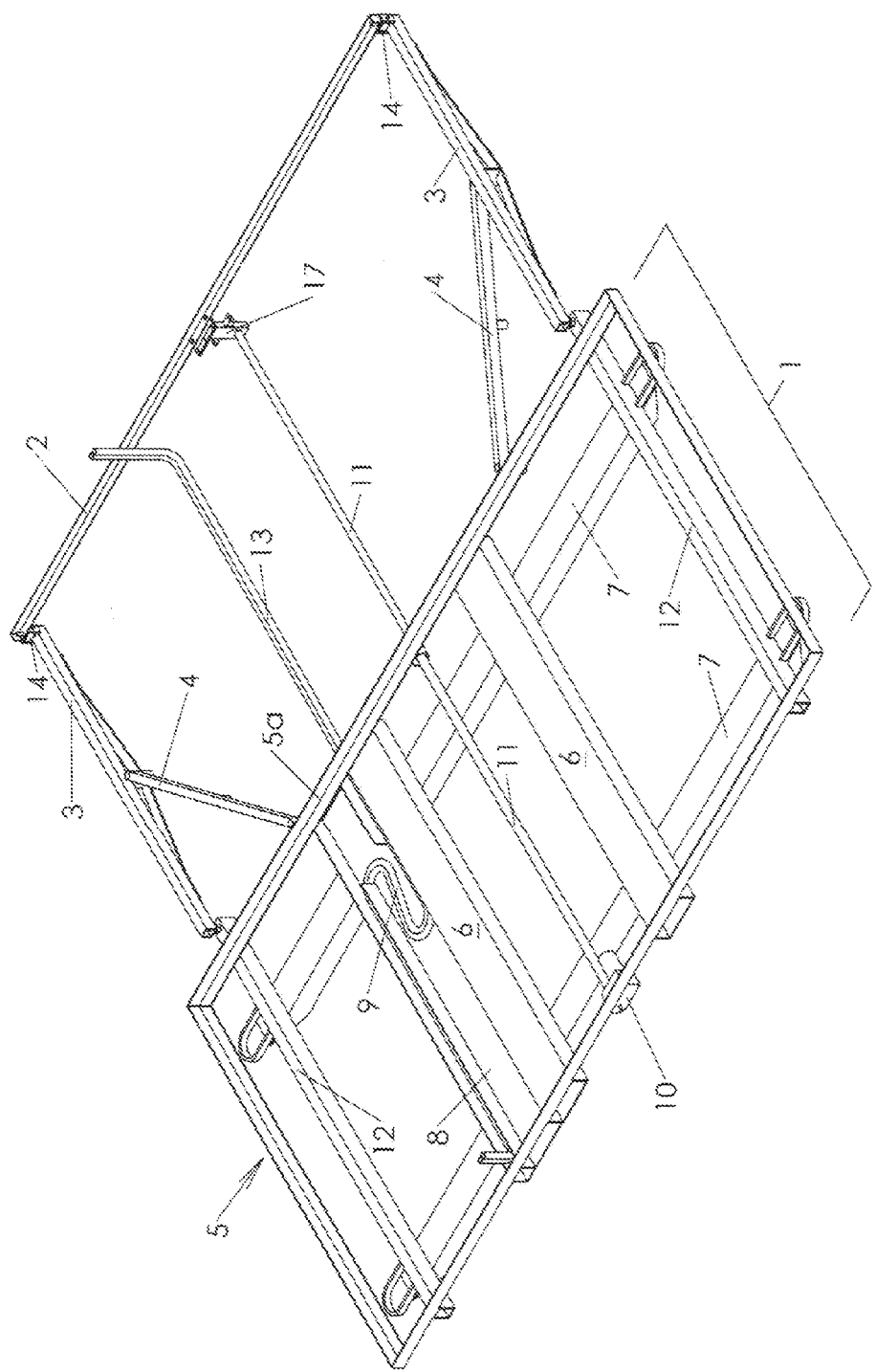
FIG. 2 is a second top perspective view of the present invention shown with the main arm in a fully extended position.
Figure 3:
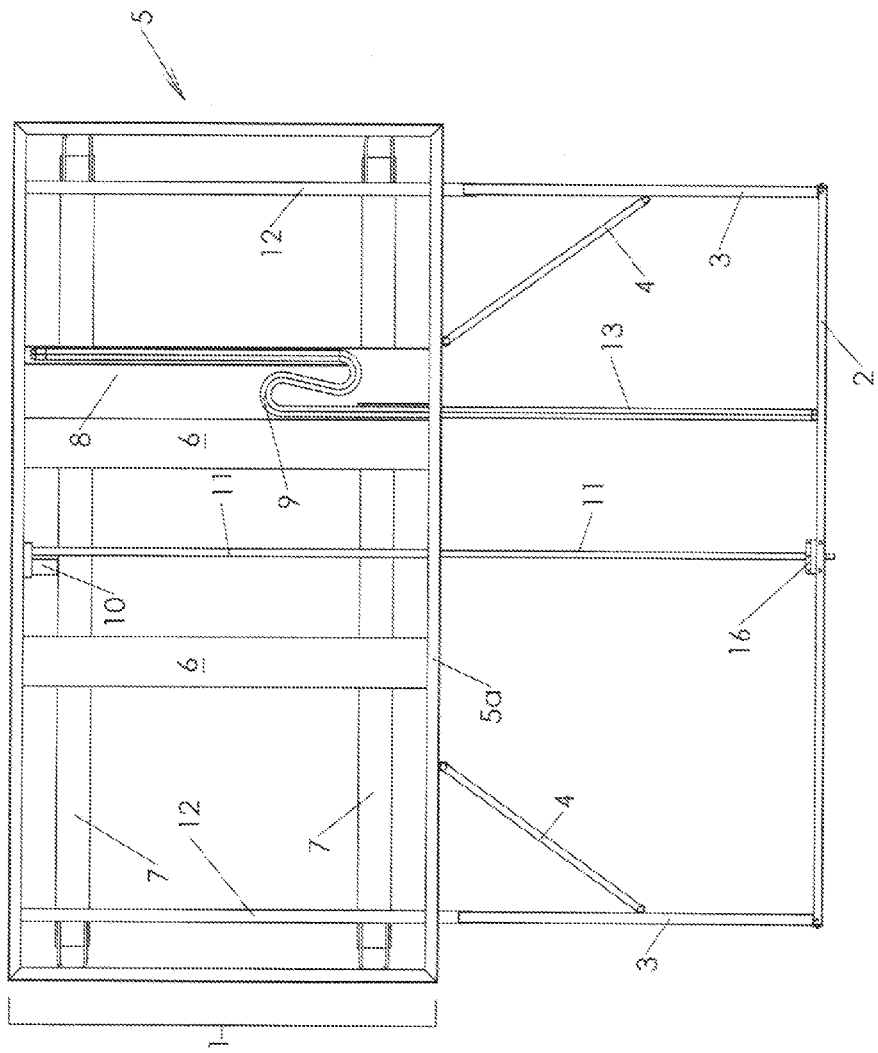
FIG. 3 is a top view of the present invention shown with the main arm in a fully extended position.

FIG. 2 is a second top perspective view of the present invention shown with the main arm in a fully extended position. In this view, the roller wheels 14 are visible. They are not visible in FIG. 1 because of the stops 15 on the end of each pivot arm 3. These stops 15 extend upward from the pivot arm 15 on the distal-most end of the pivot arm (i.e. the end opposite the end that attaches to the attachment arm 12). The point at which the pivot arm 3 attaches to the attachment arm 12 is a pivot point, as described more fully below. FIG. 3 is a top view of the present invention shown with the main arm in a fully extended position.

Figure 4:
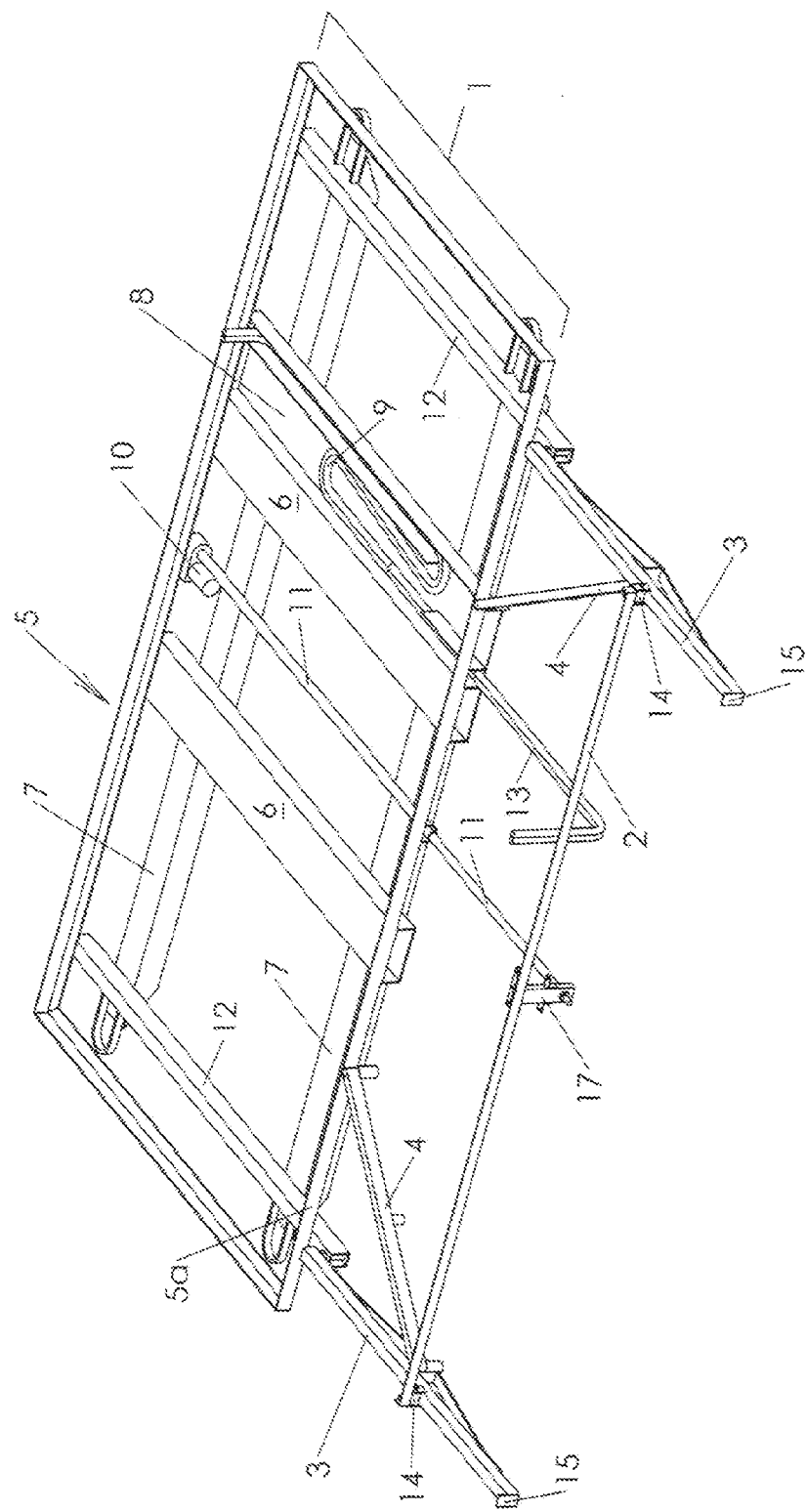
FIG. 4 is a first top perspective view of the present invention shown with the main arm in a partially extended/partially retracted position.
Figure 5:
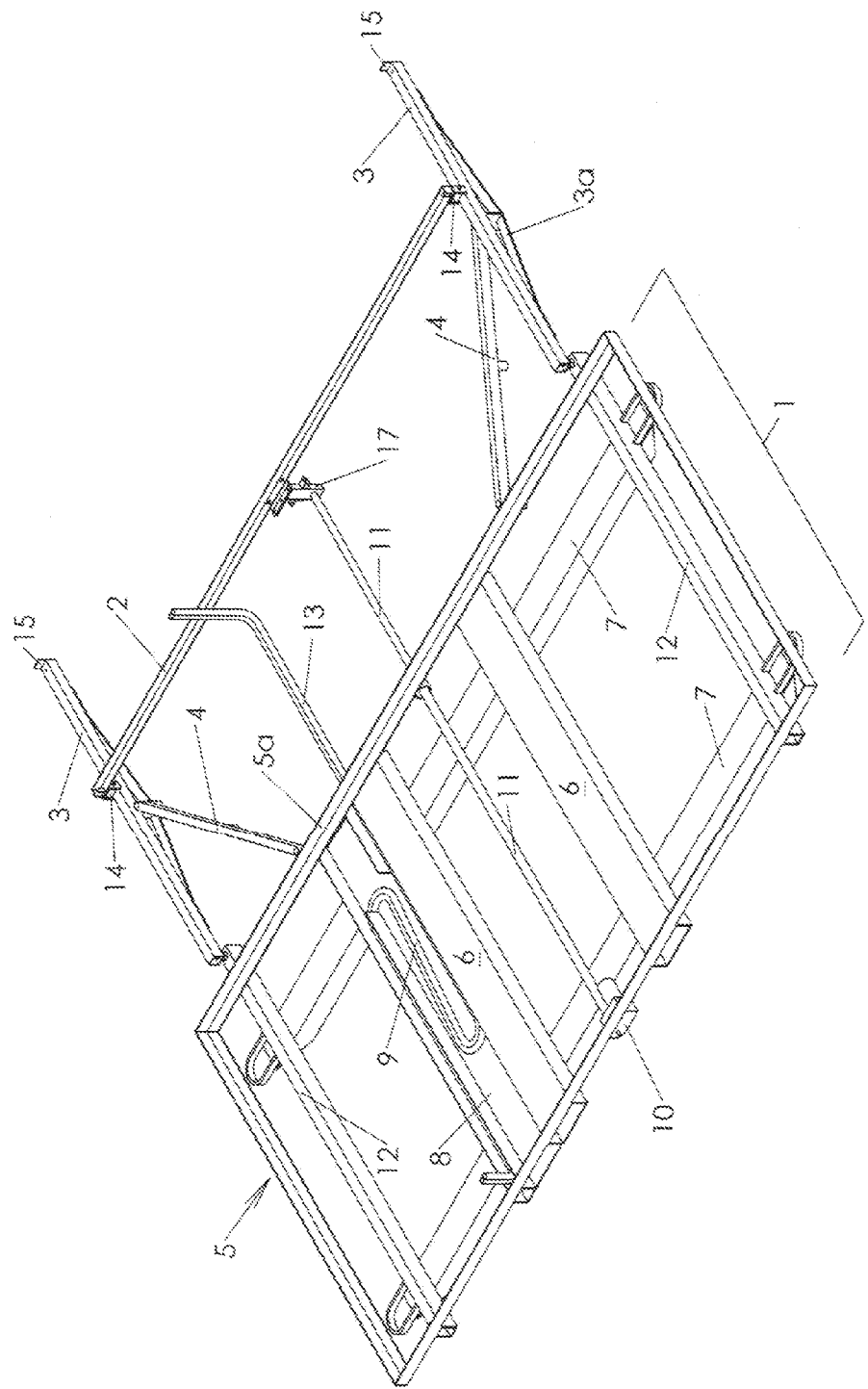
FIG. 5 is a second top perspective view of the present invention shown with the main arm in a partially extended/partially retracted position.
Figure 6:
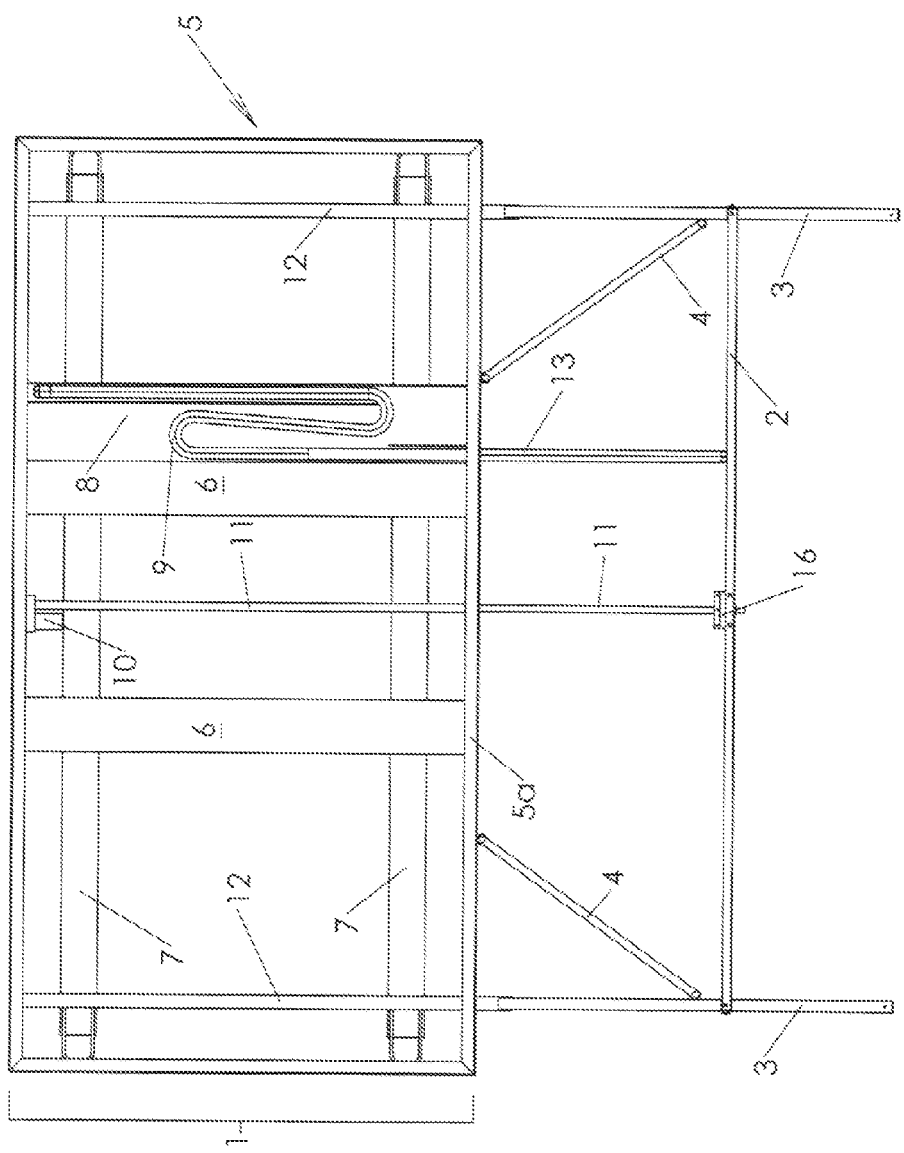
FIG. 6 is a top view of the present invention shown with the main arm in a partially extended/partially retracted position.

In FIGS. 4-6, the roller wheels 14 have moved along the pivot arms 3 to the halfway point between the stop 15 on one end of the pivot arm 3 and the end of the pivot arm 3 that is attached to the attachment arm 12 (at the pivot point). As the roller wheels 14 move along the pivot arms 3 toward the longitudinal side 5a of the perimeter frame 5, the main arm 2 also moves closer (and in parallel to) the longitudinal side 5a of the perimeter frame 5. As this happens, the cable tubing 13 is retracted into the cable tray 8, and the actuator 11 also retracts.

Figure 30:
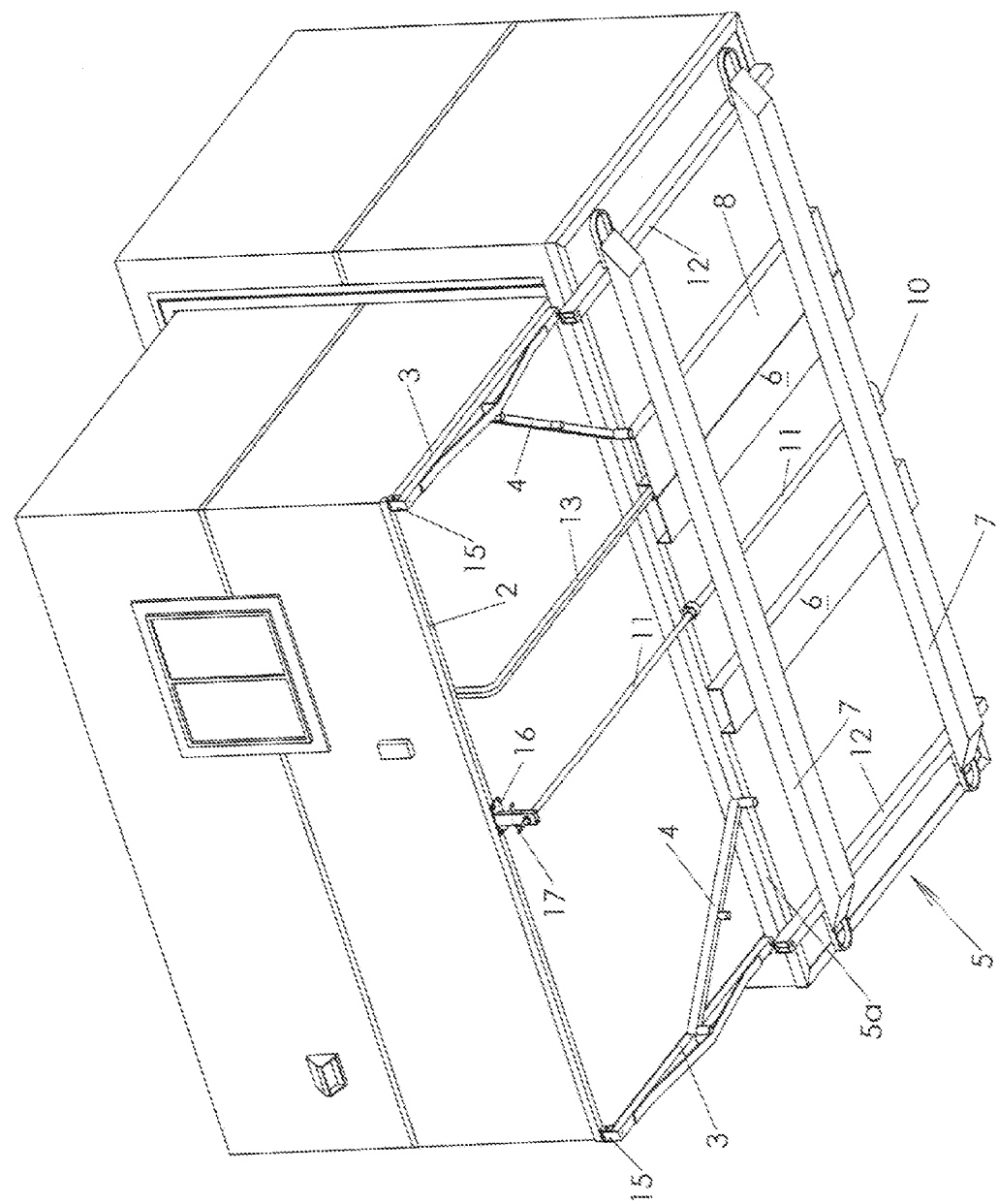
FIG. 30 is a first bottom perspective view of the present invention shown with a structure on top of it.
Figure 31:
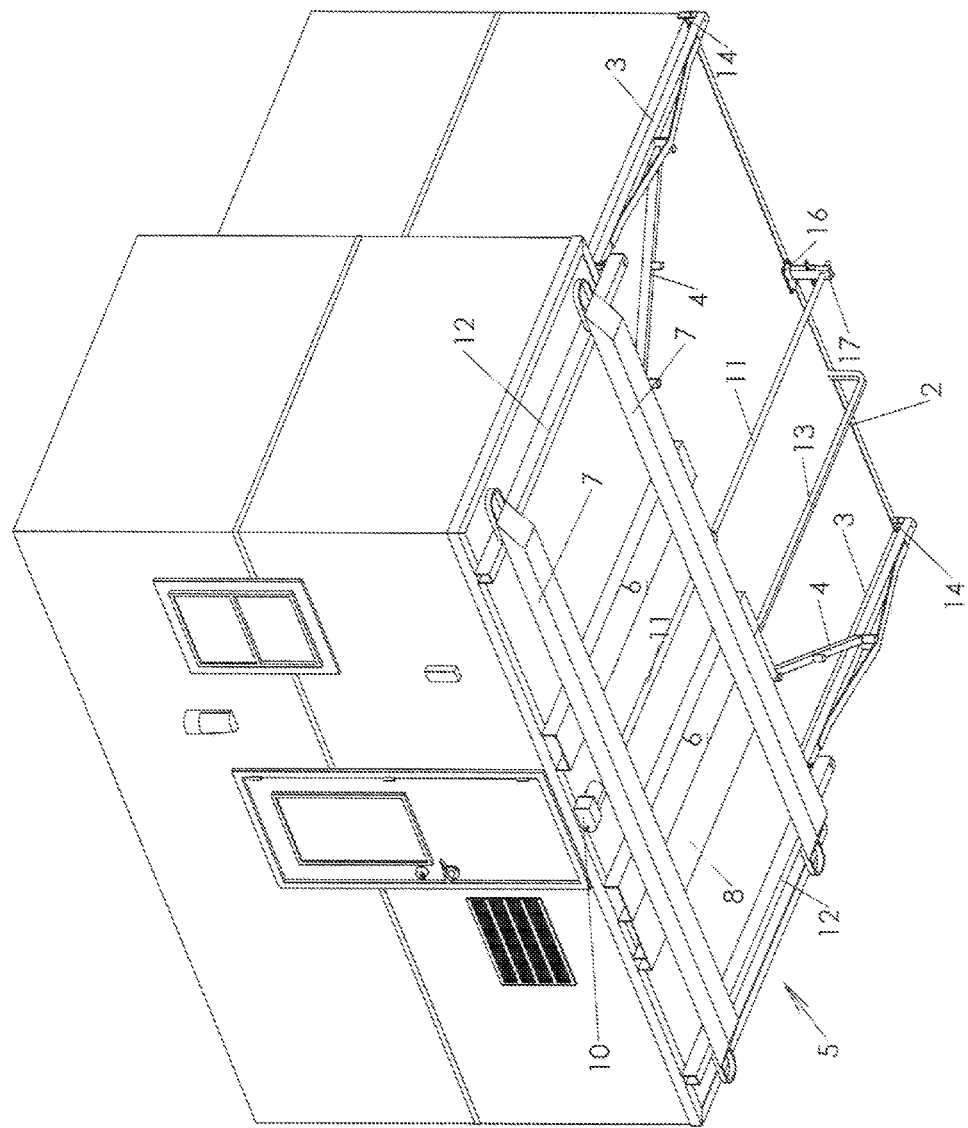
FIG. 31 is a second bottom perspective view of the present invention shown with a structure on top of it.

Note that the brace arms 4 are still in the brace position as the main arm 2 retracts (i.e. moves toward the longitudinal side 5a of the perimeter frame 5). As shown in FIG. 5, each pivot arm 3 preferably comprises a V-shaped under-support 3a that provides added strength and stability for the pivot arm 3. As shown in FIG. 6, the main arm preferably comprises a saddle bracket 16 attached on the inside of the main arm 2 at the center of the main arm 2. The saddle bracket 16 is used to install a structure on top of the main arm 2 (as shown in FIGS. 30 and 31).

Figure 7:
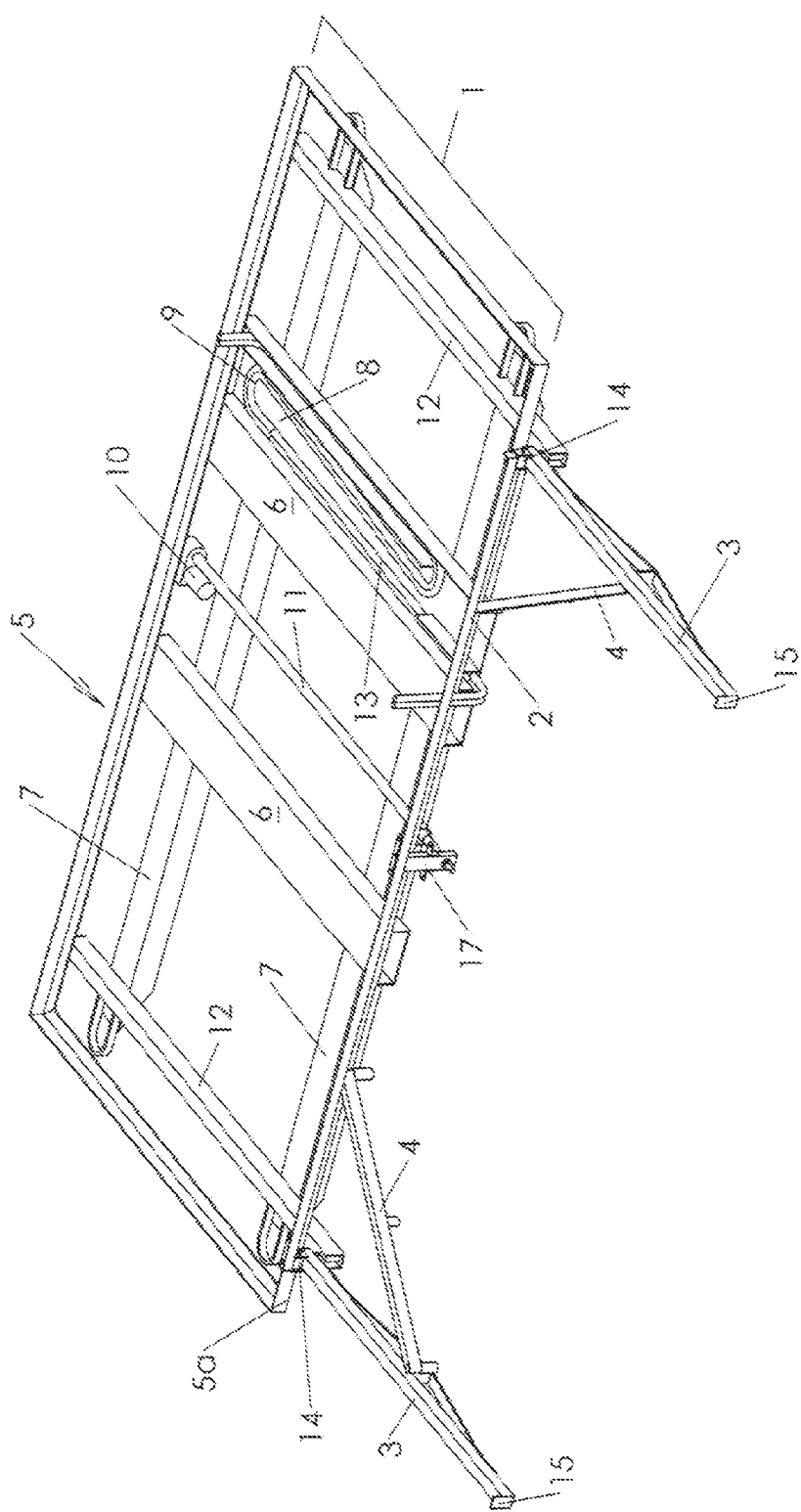
FIG. 7 is a first top perspective view of the present invention shown with the main arm in a fully retracted position.
Figure 8:
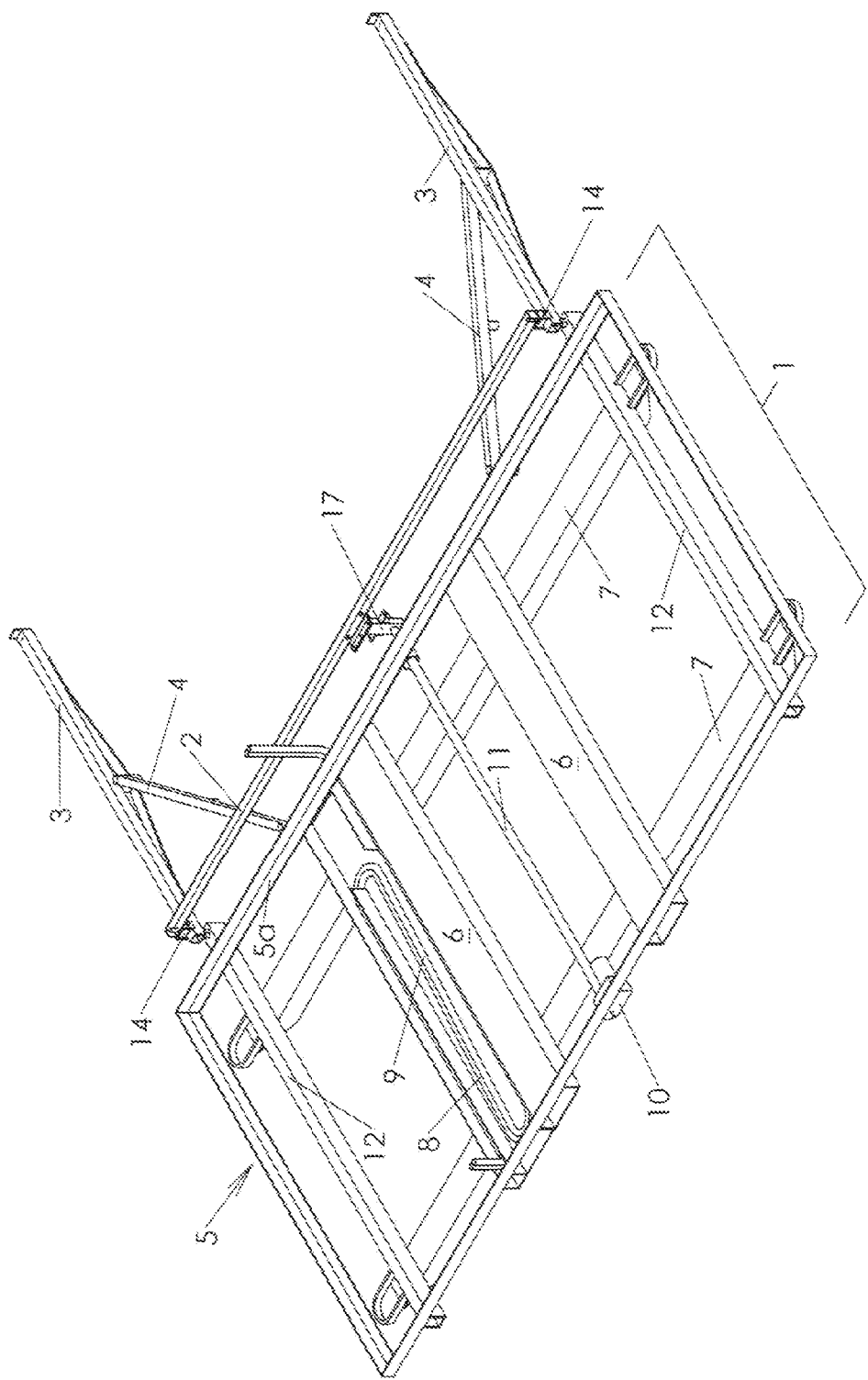
FIG. 8 is a second top perspective view of the present invention shown with the main arm in a fully retracted position.
Figure 9:
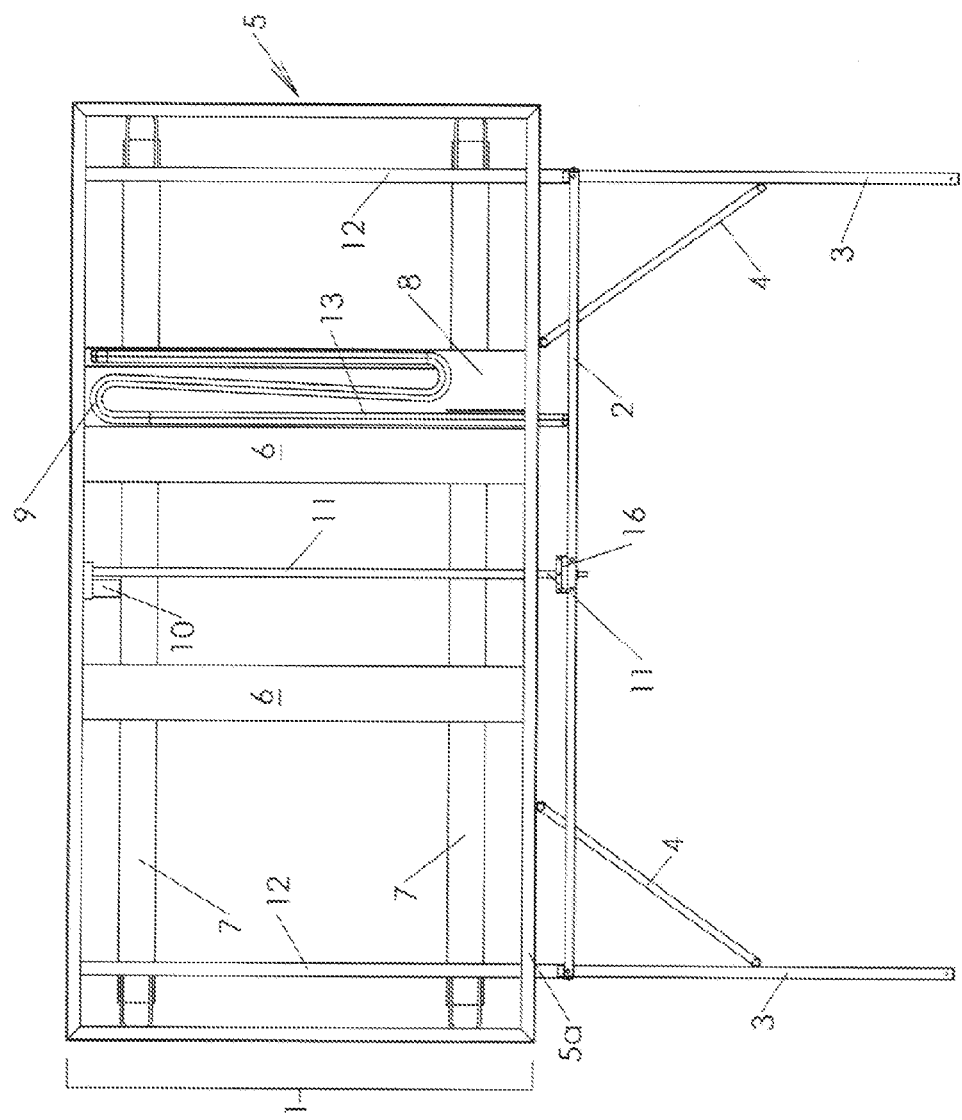
FIG. 9 is a top view of the present invention shown with the main arm in a fully retracted position.

In FIGS. 7-9, the roller wheels 14 have moved all the way along the pivot arms 3 to a point that is nearly, but not exactly, on top of the pivot point between the pivot arm 3 and the attachment arm 12. At this juncture, the main arm 2 is slightly above and adjacent to (i.e. just outside of) the longitudinal side 5a of the perimeter frame 5. The brace arms 4 may now be removed and stored in a transport position. The brace arms 4 must be removed in order to pivot the pivot arms 3 inward (i.e. toward the main arm 2).

FIG. 10 is a perspective view of the brace arm of the present invention. As shown in this figure, the brace arm 4 preferably comprises three extensions—one in the center of the brace arm 4a and one on either end of the brace arm 4b, 4c. Although these extensions are shown in the figures as downwardly extending, they could also be upwardly extending.

FIG. 10A is a detail perspective view of the brace arm in a brace position. As shown in this figure, when the brace arm 4 is in a brace position, the extension 4a on one end of the brace arm 4 is positioned inside of a receptacle 19 on the inside of the pivot arm 3, roughly in the center of the pivot arm 3. The extension 4b on the other end of the brace arm 4 is positioned inside of a receptacle 19 on the outside edge of the longitudinal side 5a of the perimeter frame 5. The extension 4a in the center of the brace arm 4 is not used in this position.

FIG. 10B is a detail perspective view of the brace arm removed from the brace position. As shown in this figure, to remove the brace arm 4, simply lift the two end extensions 4b, 4c out of the receptacles 19 and lift the brace arm 4 upward.

FIG. 10C is a detail perspective view of the brace arm in a transport position. In this position, the center extension 4a is placed into the same receptacle 19 that housed the end extension 4c when the brace arm 4 was in a brace position. In the transport position, the brace arm 4 is stowed up against the longitudinal side 5a of the perimeter frame 5.

Figure 11:
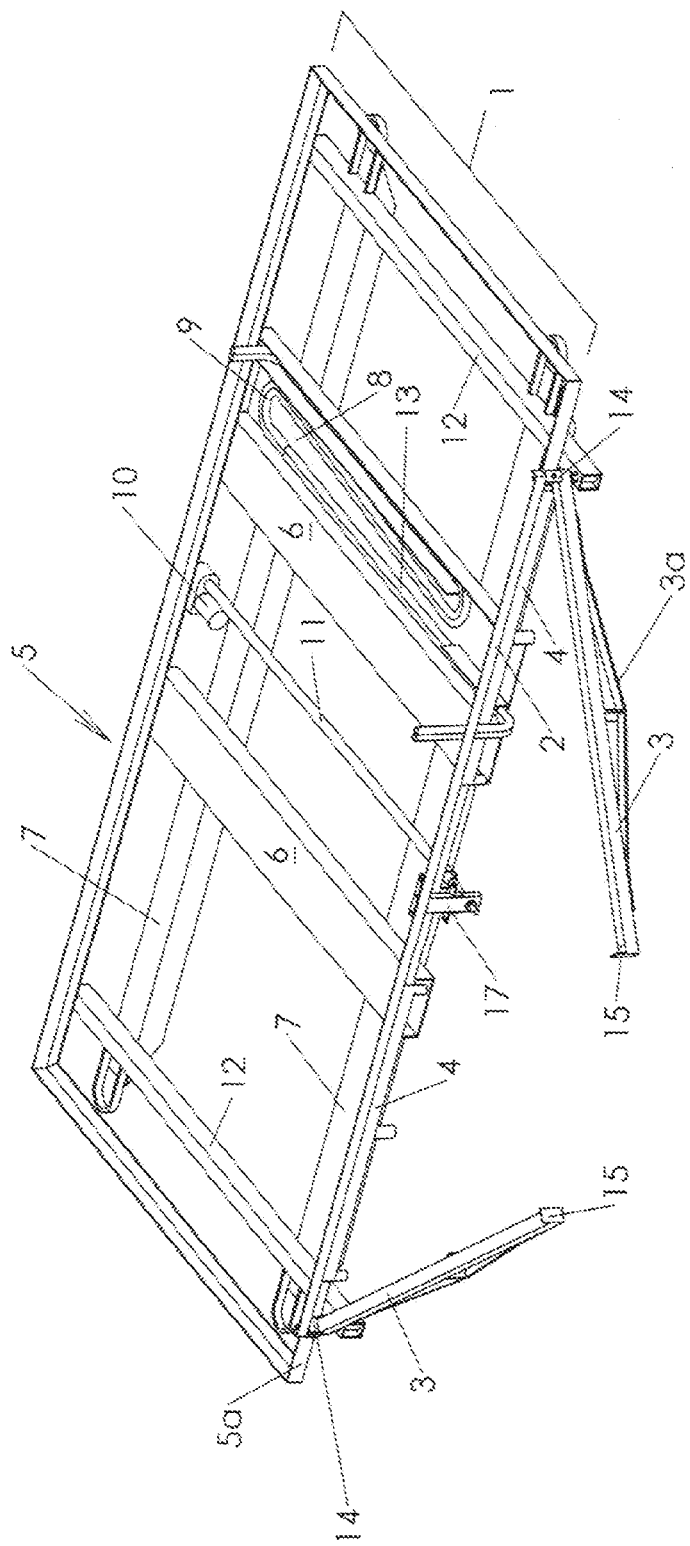
FIG. 11 is a top perspective view of the present invention with the pivot arms at a forty-five (45)-degree angle relative to the main arm.
Figure 12:
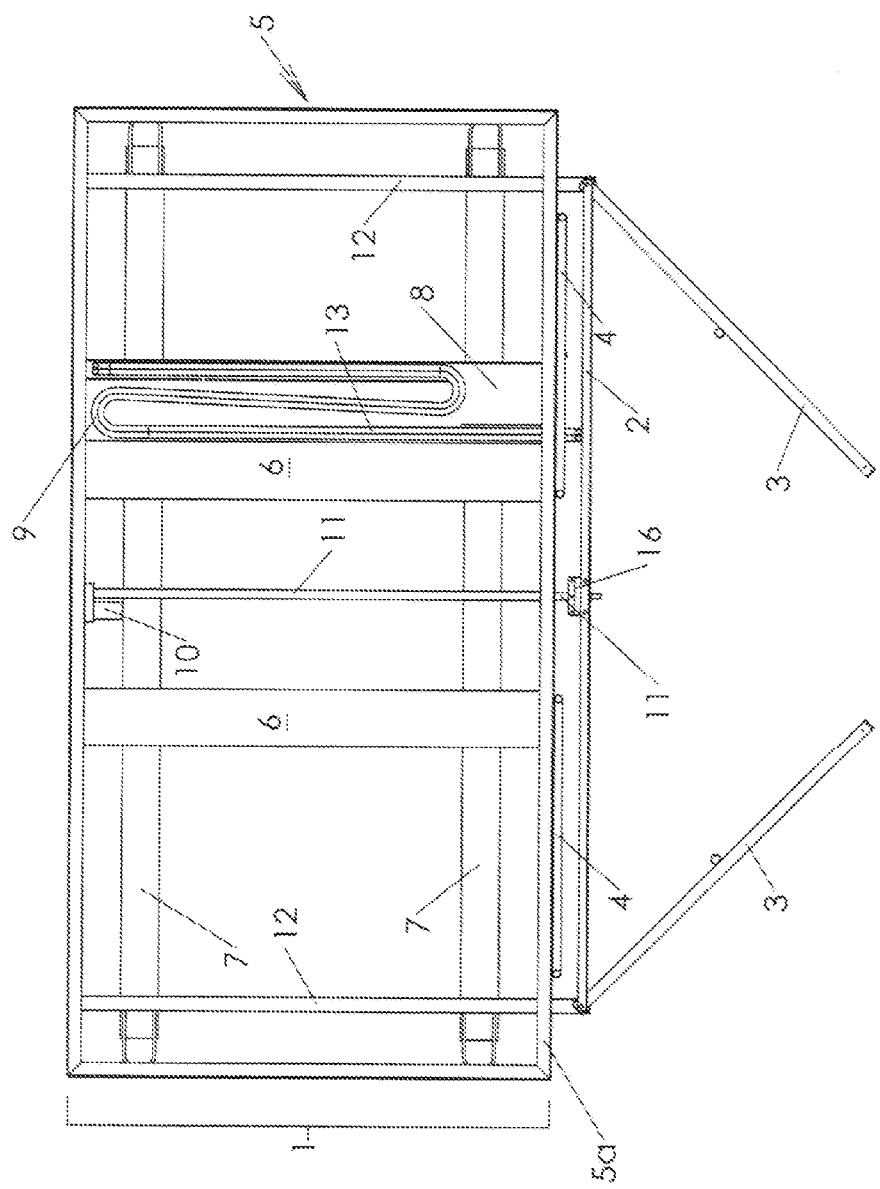
FIG. 12 is a top view of the present invention with the pivot arms at a forty-five (45)-degree angle relative to the main arm.

FIG. 11 is a top perspective view of the present invention with the pivot arms at a forty-five (45)-degree angle relative to the main arm. Once the brace arms 4 have been stowed in the transport position, the pivot arms 3 can be rotated (or pivoted) toward the main arm 2. As noted above, the point at which the pivot arm 3 connects to the attachment arm 12 is a pivot point. This pivot point is shown in detail in FIGS. 18-26 and 33-34. As the pivot arm 3 is rotated inward (toward the main arm 2) at the pivot point on the attachment arm 12, the roller wheel 14, which sits on top of the pivot arm 3 on the end closest to the attachment arm 12, also pivots. Specifically, the roller wheel bracket 14a comprises an upwardly extending pin 14b that is inserted into a hole 2a on either end of the main arm 2 (see FIG. 35); this pin 14b rotates within the hole 2a (and the sleeve 23 above the hole 2a) so that the roller wheel 14 can turn with the pivot arm 3 but rotate relative to the main arm 2. FIG. 12 is a top view of the present invention with the pivot arms at a forty-five (45)-degree angle relative to the main arm.

Figure 13:
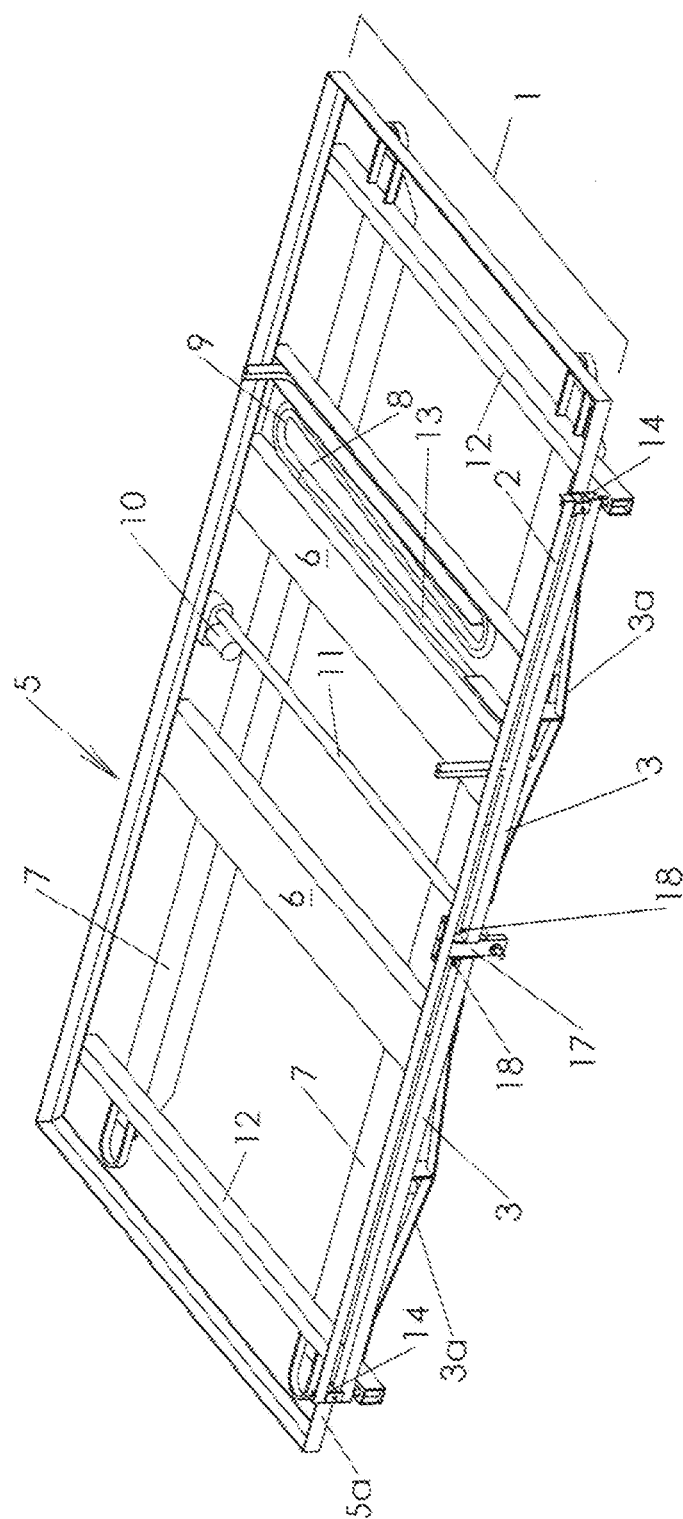
FIG. 13 is a top perspective view of the present invention with the pivot arms in a fully retracted position.
Figure 14:
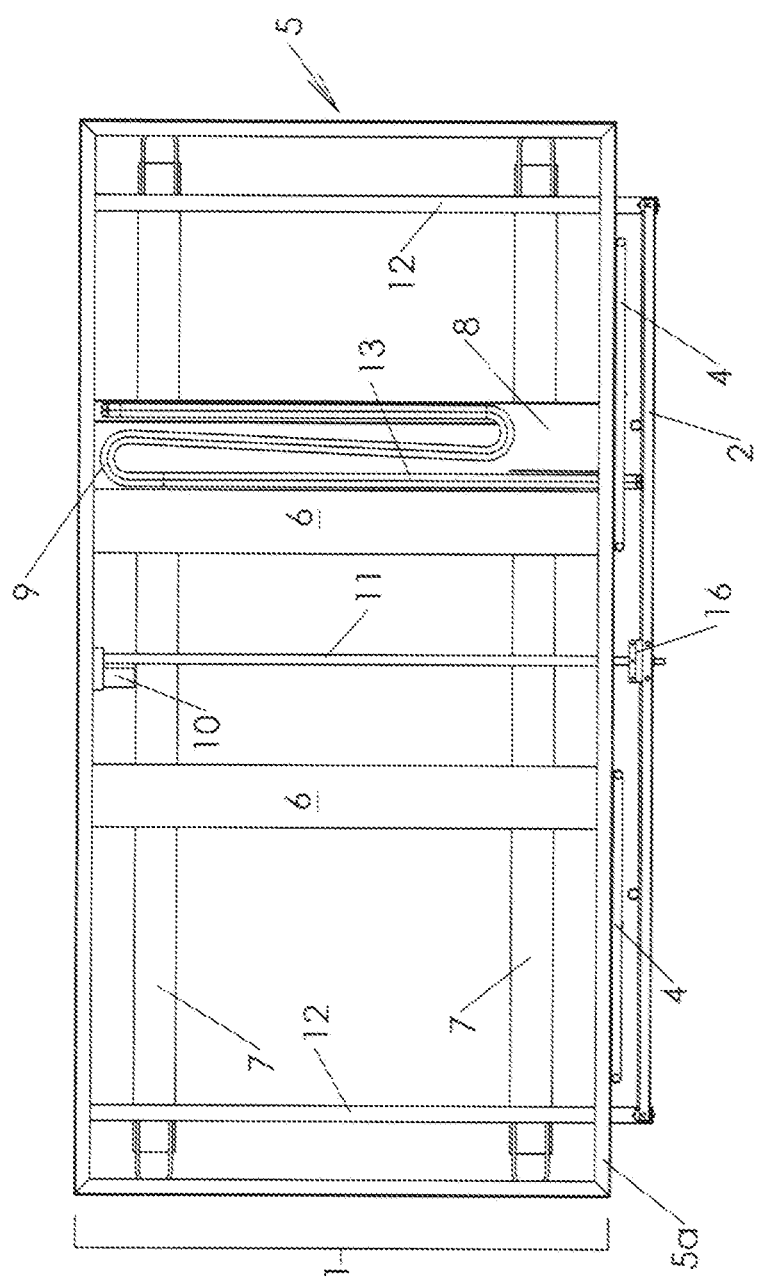
FIG. 14 is a top view of the present invention with the pivot arms in a fully retracted position.

FIGS. 13 and 14 show the pivot arms in a fully retracted position; that is, each pivot arm 3 has been fully rotated (at the pivot point on the attachment arm 12) so that the pivot arms 3 now lie directly underneath the main arm 2. Both the main arm 2 and the pivot arms 3 are now parallel with the longitudinal side 5a of the perimeter frame 5.

Figure 15:
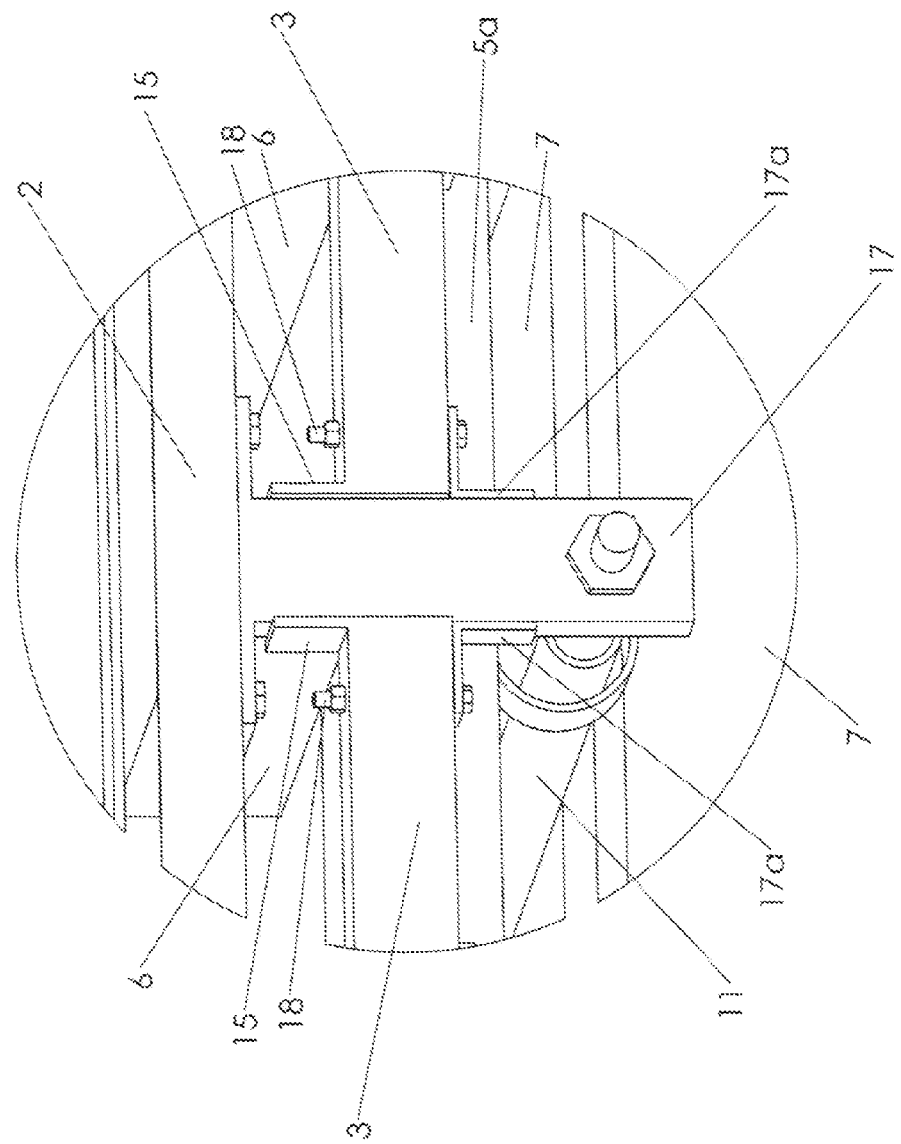
FIG. 15 is a detail perspective view of the pivot arms stowed on the center bracket of the main arm.

FIG. 15 is a detail perspective view of the pivot arms stowed on the center bracket of the main arm. As shown in this figure, when the pivot arms 3 are in a fully retracted or stowed position, the distal ends of the pivot arms 3 are placed on top of supporting brackets 17a that extend laterally from the center bracket 17. A pin or bolt 18 is then inserted through a hole in the distal end of the pivot arm 3 and also through the supporting bracket 17a to hold the pivot arm 3 in place.

Figure 16:
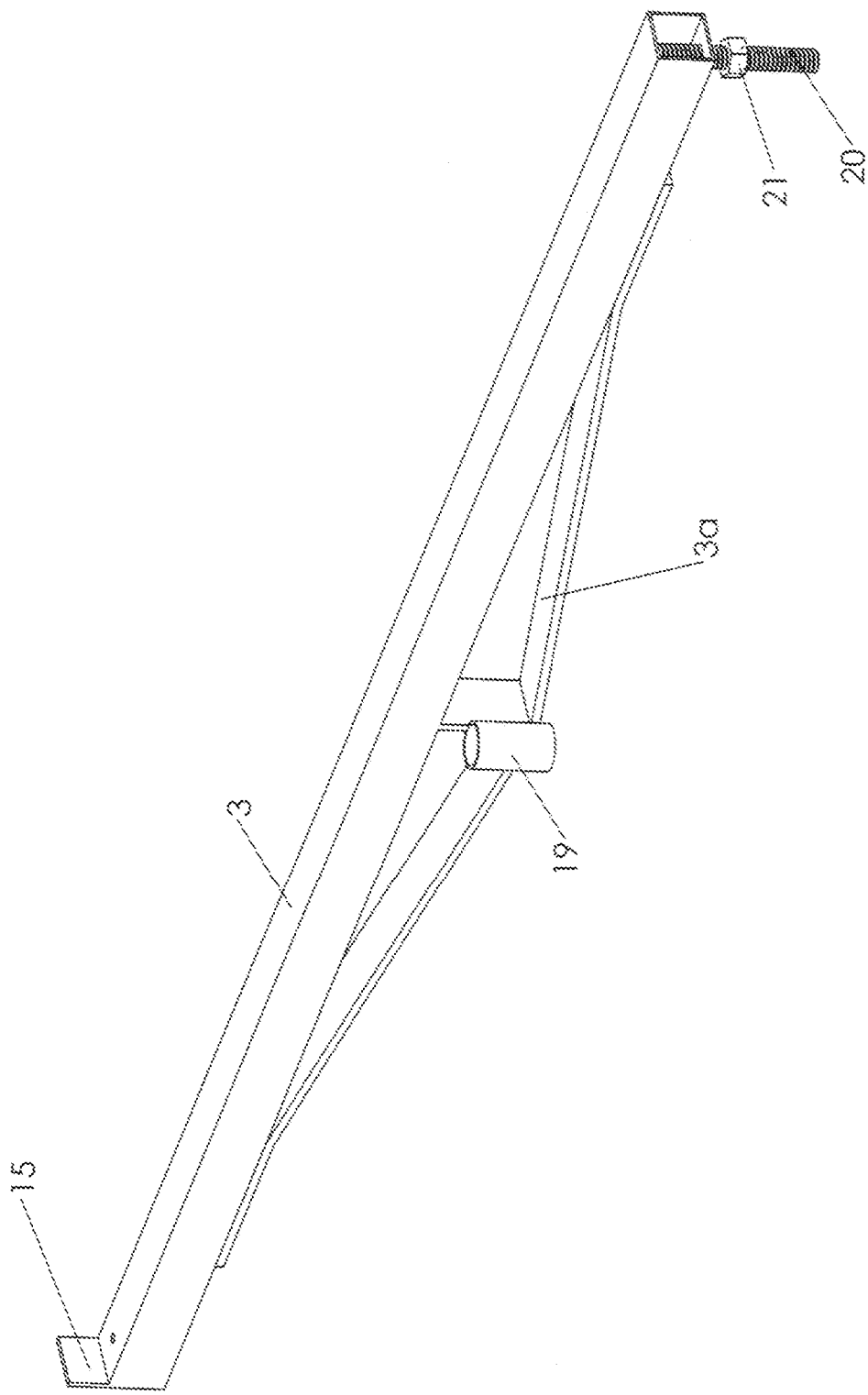
FIG. 16 is a perspective view of the pivot arm of the present invention.

FIG. 16 is a perspective view of the pivot arm of the present invention. As noted above, the distal end of each pivot arm 3 preferably comprises an upwardly extending stop 15 that prevents the roller wheel 18 from traveling off the distal end of the pivot arm 3. This figure also shows the V-shaped under-support 3a and receptacle 19 mentioned above. The proximal end of the pivot arm preferably comprises a downwardly extending threaded bolt 20 and nut 21, which surrounds the bolt 20. This bolt 20 is fixedly attached to the proximal end of the pivot arm 3 (see FIGS. 19-23 and 25-26), and it extends into a sleeve 22 in the attachment arm 12 (see FIGS. 33 and 34). The nut 21 can be raised or lowered on the bolt 20 to raise or lower the vertical position of the pivot arm 3 relative to the attachment arm 5.

Figure 35:
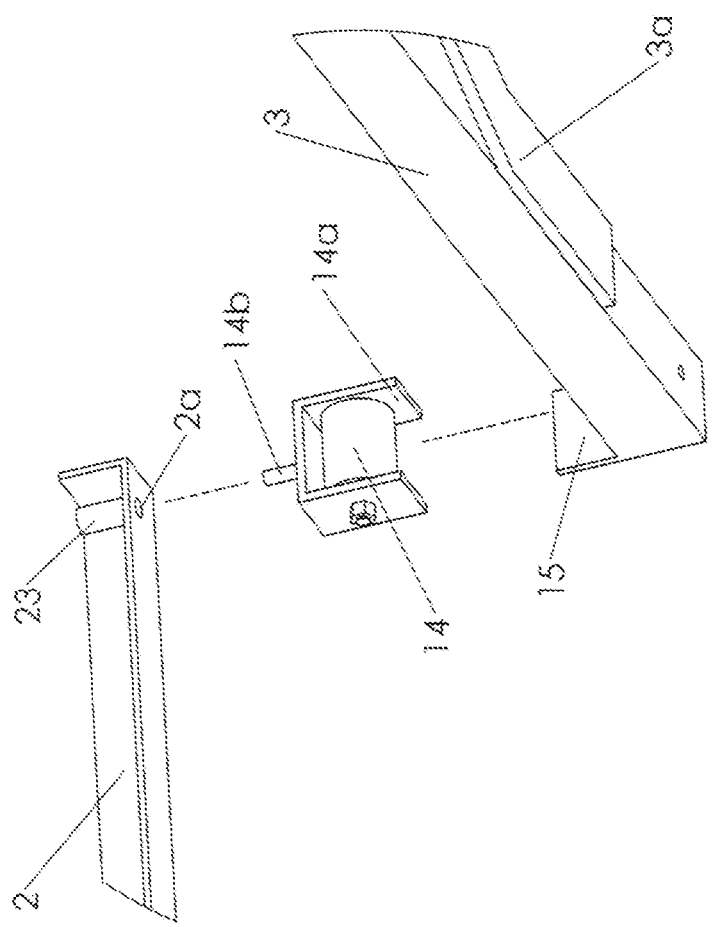
FIG. 35 is an exploded view of the main arm, roller wheel and pivot arm.

FIG. 17 is a perspective view of the roller wheel and roller wheel bracket of the present invention. As shown in FIG. 35, the upwardly extending pin 14b is inserted into a hole 2a on the underside of the end of the main arm 2 and is allowed to rotate freely within a sleeve 23 located just above the hole 2a. As shown in this figure, the roller wheel 14 rotates about an axle 14c that is secured to the roller wheel bracket 14a with a nut 21.

FIG. 18 is a detail side view of the pivot point between the attachment arm and the pivot arm shown with the pivot arm fully extended, and FIG. 19 is a section view of the pivot point shown in FIG. 18 (taken at A-A). As shown in FIG. 18, the pivot point at the top of the roller wheel 14 (i.e., the upwardly extending pin 14b) is offset vertically from the pivot point at the bolt 20 between the attachment arm 12 and the pivot arm 3.

FIG. 20 is a detail side view of the pivot point between the attachment arm and the pivot arm shown with the pivot arm at a forty-five (45)-degree angle relative to the main arm, and FIG. 21 is a section view of the pivot point shown in FIG. 20 (taken at B-B). At this stage, the upwardly extending pin 14b is nearly vertically aligned with the bolt 20.

FIG. 22 is a detail side view of the pivot point between the attachment arm and the pivot arm shown with the pivot arm fully retracted/stowed, and FIG. 23 is a section view of the pivot point shown in FIG. 22 (taken at C-C). At this stage, the upwardly extending pin 14b is vertically aligned with the bolt 20. Thus, as the distal end of the pivot arm 3 is rotated inward (toward the center bracket 17), the upper and lower pivot points align (that is, the upwardly extending pin 14b and the bolt 20), and the main arm 2 is tightened up against the longitudinal side 5a of the perimeter frame 5.

Figure 24:
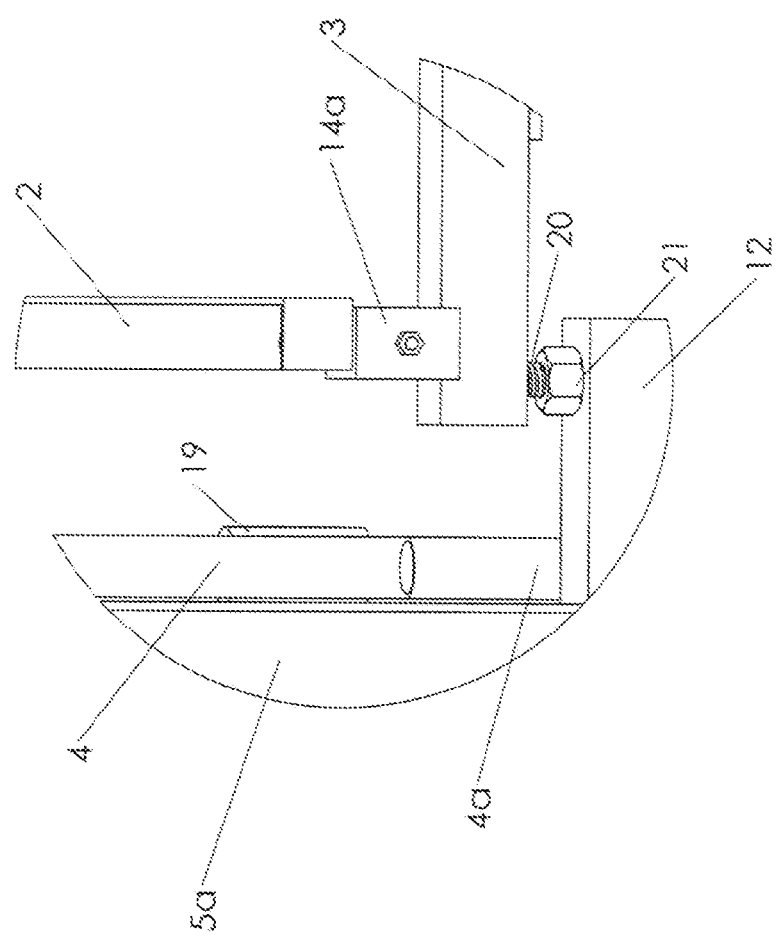
FIG. 24 is a detail perspective view of the pivot point shown in FIGS. 18 and 19.
Figure 25:
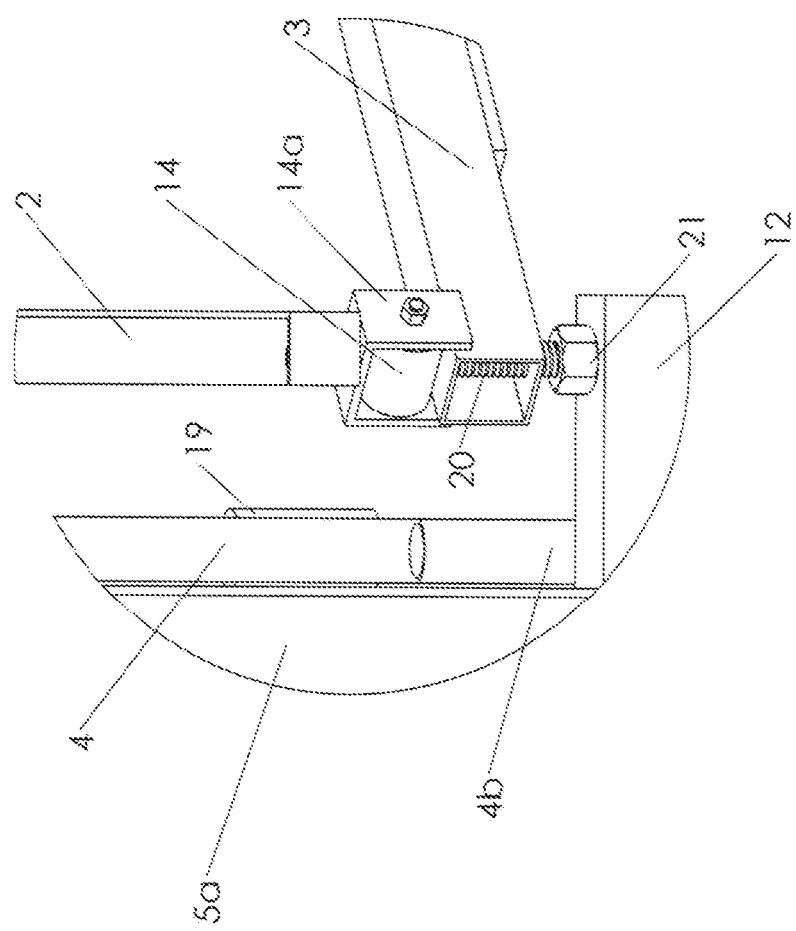
FIG. 25 is a detail perspective view of the pivot point shown in FIGS. 20 and 21.
Figure 26:
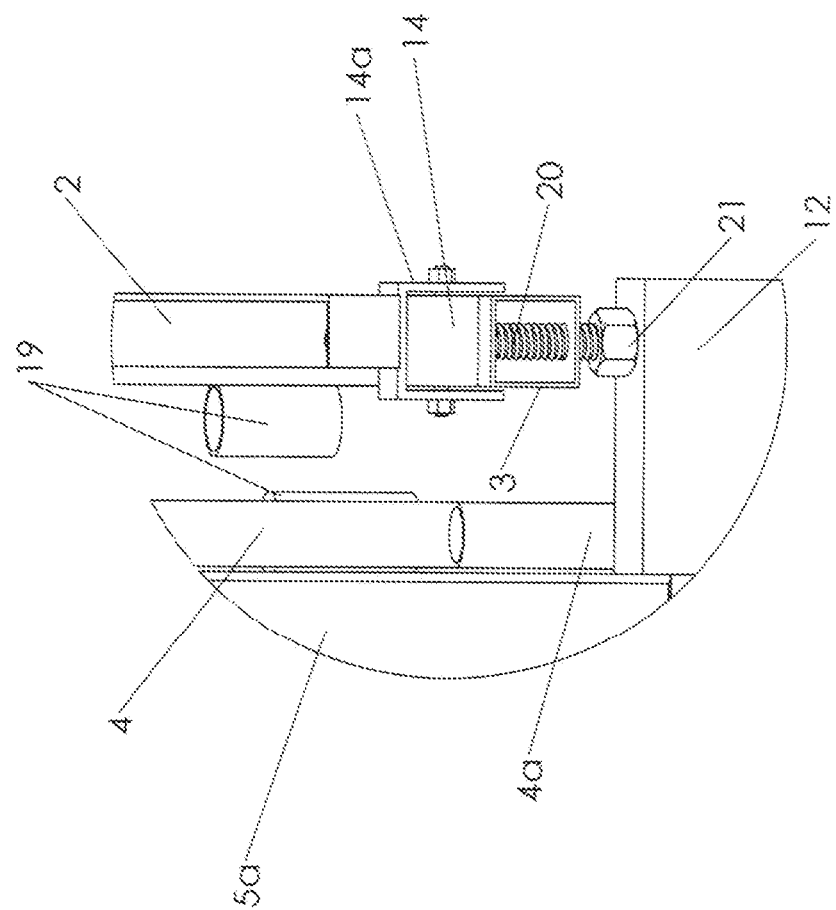
FIG. 26 is a detail perspective view of the pivot point shown in FIGS. 22 and 23.

FIG. 24 is a detail perspective view of the pivot point shown in FIGS. 18 and 19, FIG. 25 is a detail perspective view of the pivot point shown in FIGS. 20 and 21, and FIG. 26 is a detail perspective view of the pivot point shown in FIGS. 22 and 23. Note that in FIG. 24, the brace arm 4 is in a brace position, whereas in FIGS. 25 and 26, the brace arm 4 is in a stowed position.

FIGS. 27-29 are a first top perspective view, a second top perspective view, and a top view, respectively, of the present invention shown with the main arm in a fully extended position and with a manual actuation system. The only difference between these figures and FIGS. 1-3 is that the motor 10 and actuator 11 have been replaced with a lateral tube 24 and a lateral rectangular conduit 25. The lateral tube 24 extends from the center bracket 17 to the lateral rectangular conduit 25, which extends from one longitudinal side of the perimeter frame 5 to the other. The lateral rectangular conduit 25 houses a threaded lateral receptacle (not shown) into which is received the lateral tube 24, which is also preferably threaded. In this manner, the main arm 2 (and roller wheels 14) can be moved toward or away from the longitudinal side 5a of the perimeter frame 5 by rotating the lateral tube 24 in one direction or the other.

FIG. 30 is a first bottom perspective view, and FIG. 31 is a second bottom perspective view, of the present invention shown with a structure on top of it. As shown in these figures, one half of the structure (in this case, a portable home) is installed on top of the non-telescoping frame 1. The other half of the structure (the telescoping part) is installed onto the main arm 2 via the saddle bracket 16. This half of the structure telescopes into the first half of the structure (on top of the non-telescoping frame 1) as the main arm 2 is moved toward the longitudinal side 5a of the perimeter frame 5.

Figure 32:
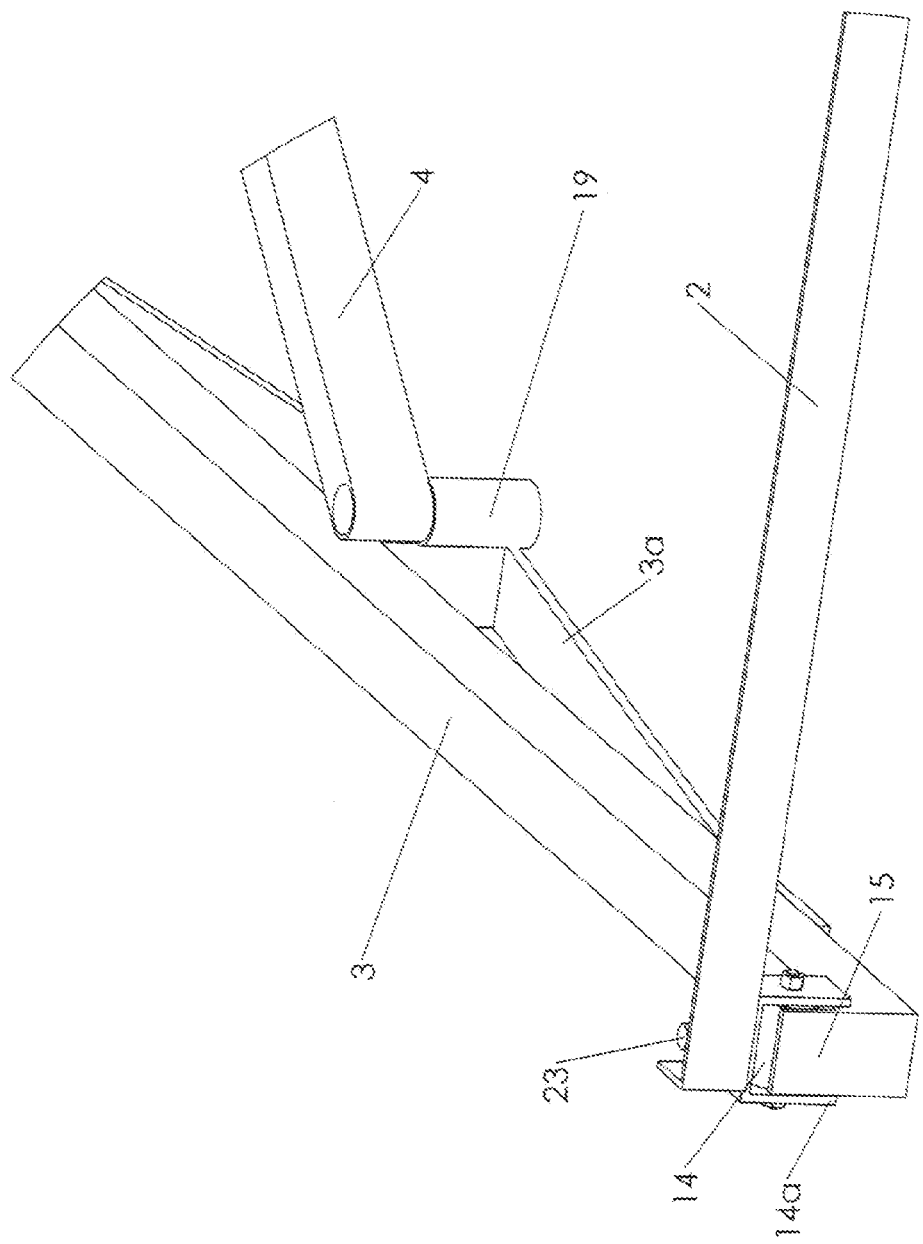
FIG. 32 is a detail perspective view of the roller wheel on the pivot arm with the main arm in a fully extended position.

FIG. 32 is a detail perspective view of the roller wheel on the pivot arm with the main arm in a fully extended position. This figure shows more clearly the stop 15 at the distal end of the pivot arm 3.

Figure 33:
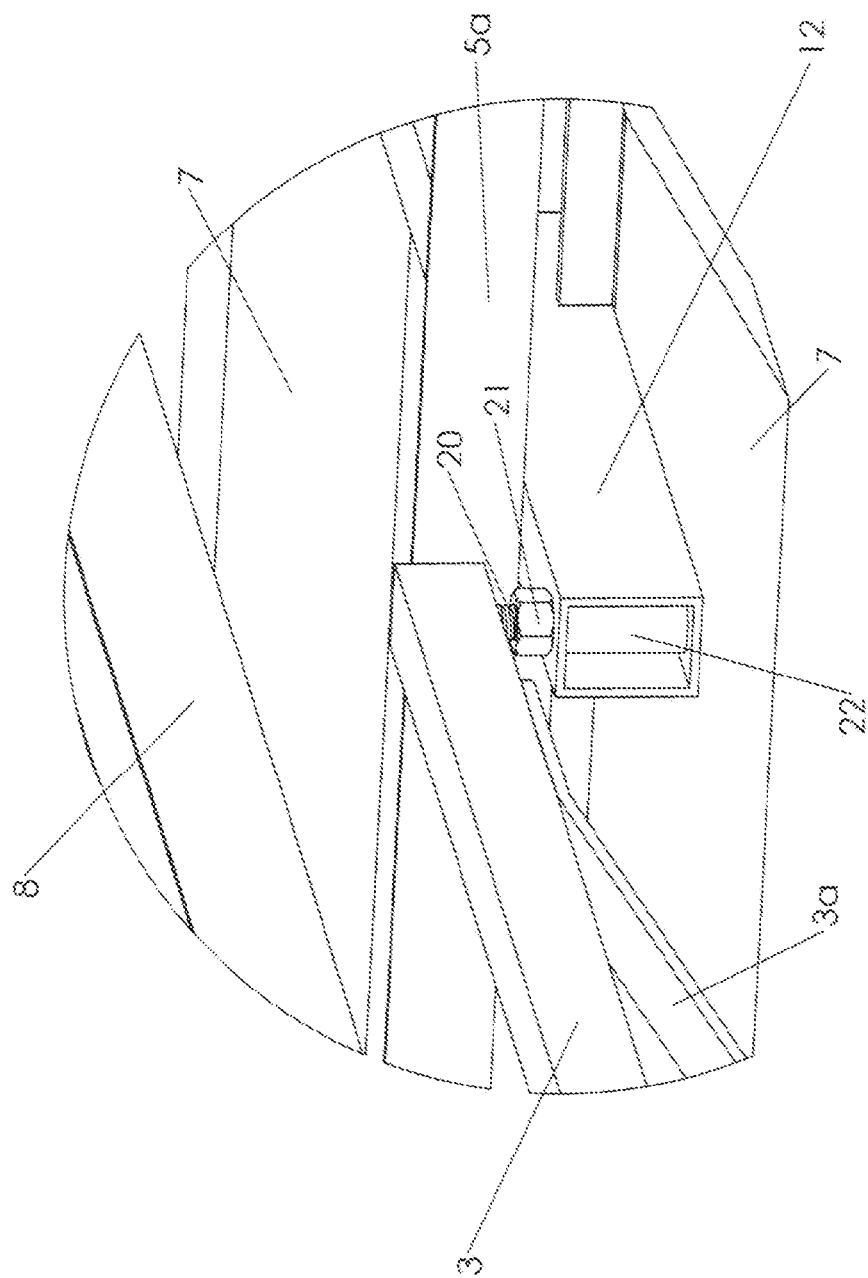
FIG. 33 is a detail perspective view of the pivot point between the attachment arm and the pivot arm shown with the pivot arm fully extended.

FIG. 33 is a detail perspective view of the pivot point between the attachment arm and the pivot arm shown with the pivot arm fully extended. This figure clearly shows the sleeve 22 in the attachment arm 12.

Figure 34:
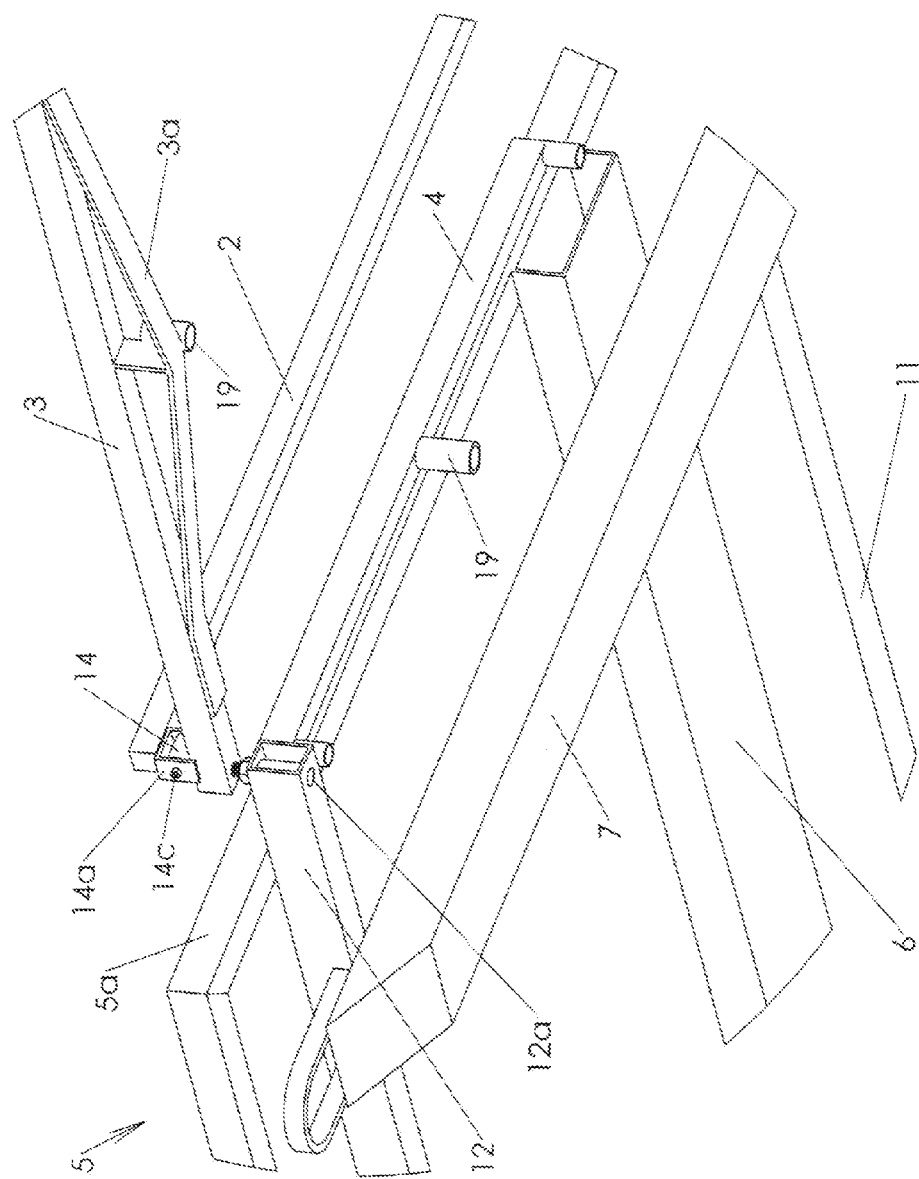
FIG. 34 is a detail bottom perspective view of the present invention showing the pivot point between the attachment arm and the pivot arm.

FIG. 34 is a detail bottom perspective view of the present invention showing the pivot point between the attachment arm and the pivot arm. In this figure, the brace arm 4 is in a stowed position, and the pivot arm 3 is fully extended. Note that if necessary, the bolt 20 may extend through a hole 12a in the bottom of the attachment arm 12.

The foregoing figures depict a typical configuration of the present invention in which the rectangular perimeter frame 5 is roughly sixteen (16) feet long; however, the present invention can be scaled to accommodate configurations in which the rectangular perimeter frame 5 is up to sixty (60) feet long or longer. This is accomplished by adding pivot arms 3 and actuators 11. FIGS. 36-41 illustrate alternate embodiments of the present invention in which there are at least three pivot arms 3 and at least two actuators 11. All other details of the invention remain the same as described above.

Figure 36:
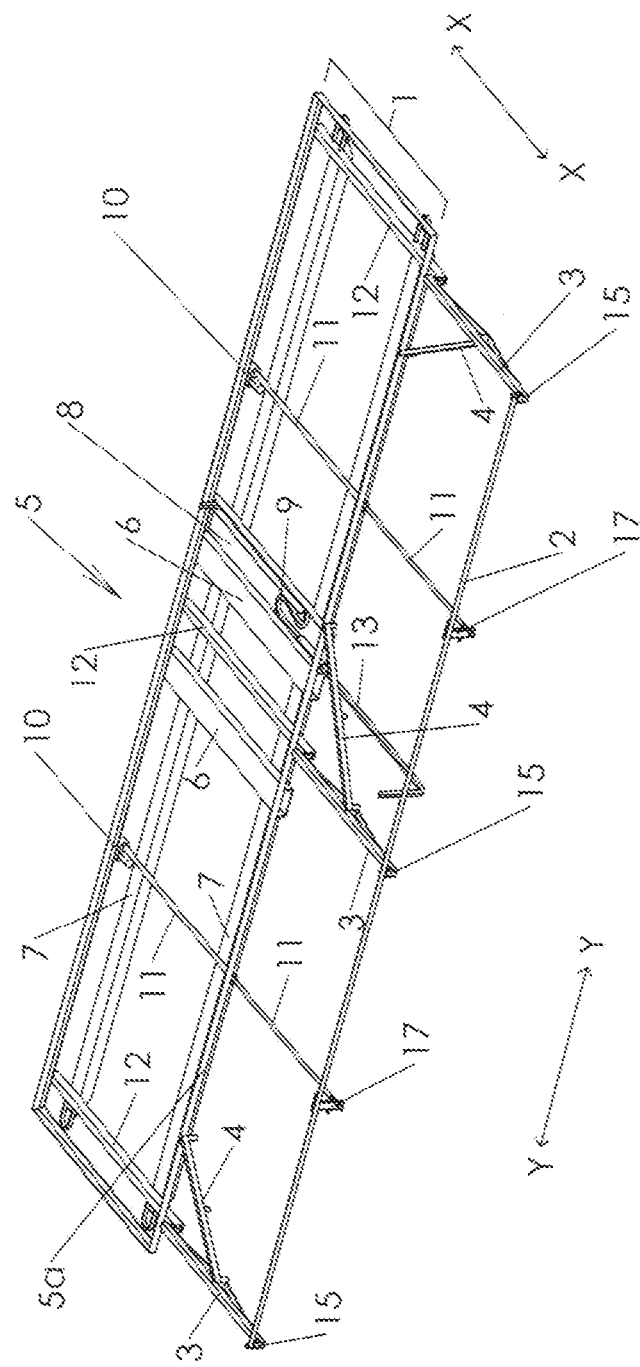
FIG. 36 is a perspective view of the present invention with three pivot arms and two actuators.
Figure 37:
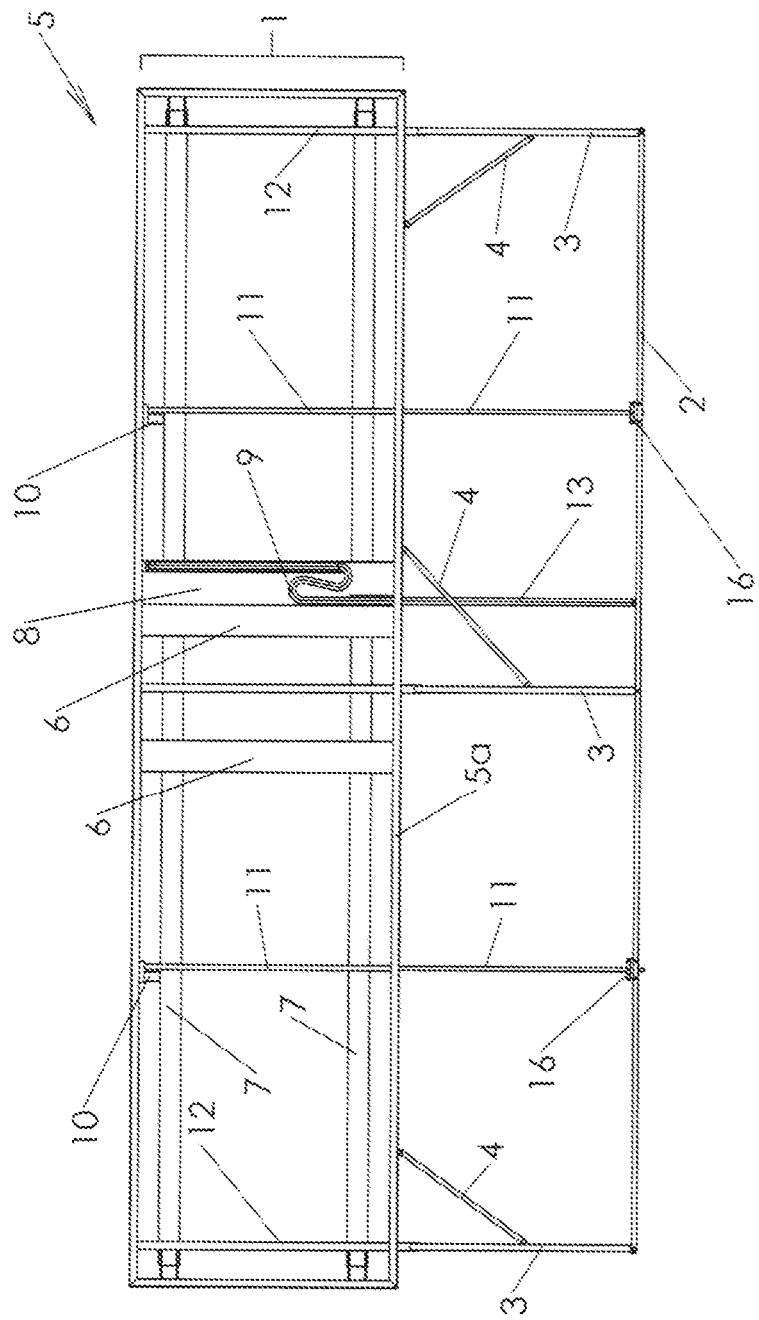
FIG. 37 is a top view of the embodiment shown in FIG. 36.

FIG. 36 is a perspective view of the present invention with three pivot arms and two actuators. FIG. 37 is a top view of the embodiment shown in FIG. 36. In this embodiment, the overall length of the rectangular perimeter frame 5 has been doubled (as compared to the embodiment shown in FIG. 1) by adding a single pivot arm 3 and actuator 11.

Figure 38:
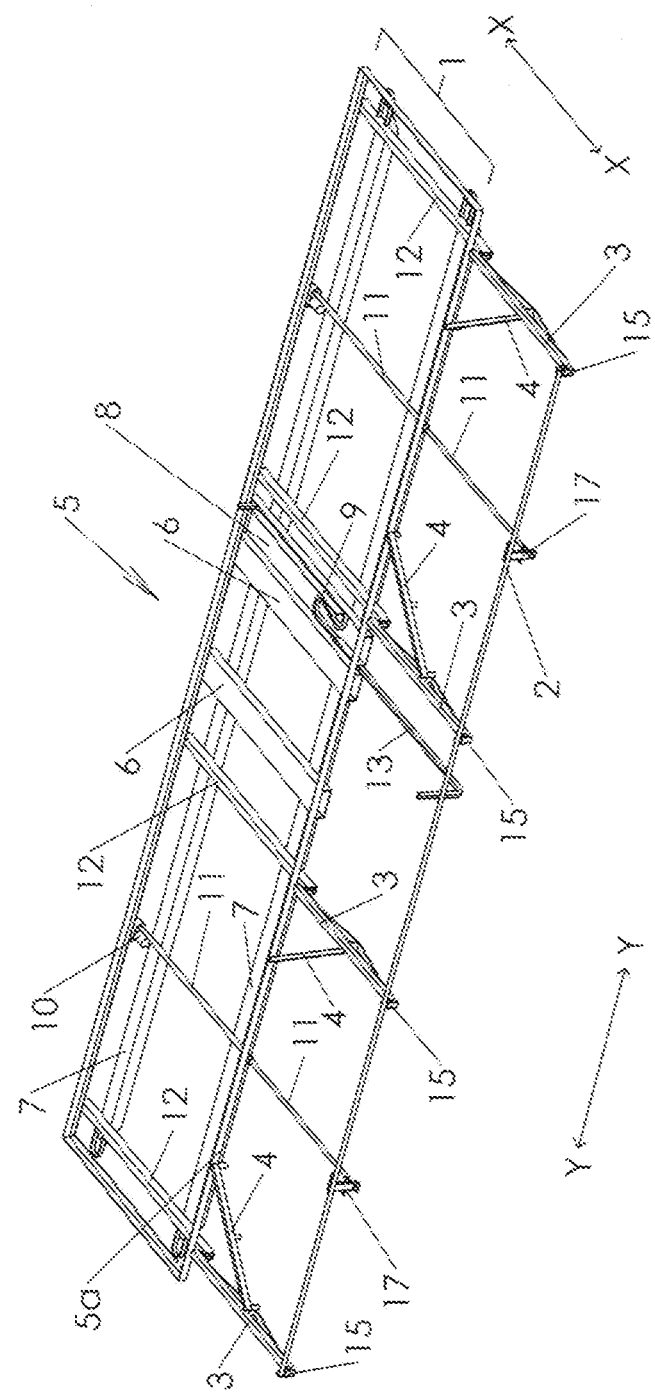
FIG. 38 is a perspective view of the present invention with four pivot arms and two actuators.
Figure 39:
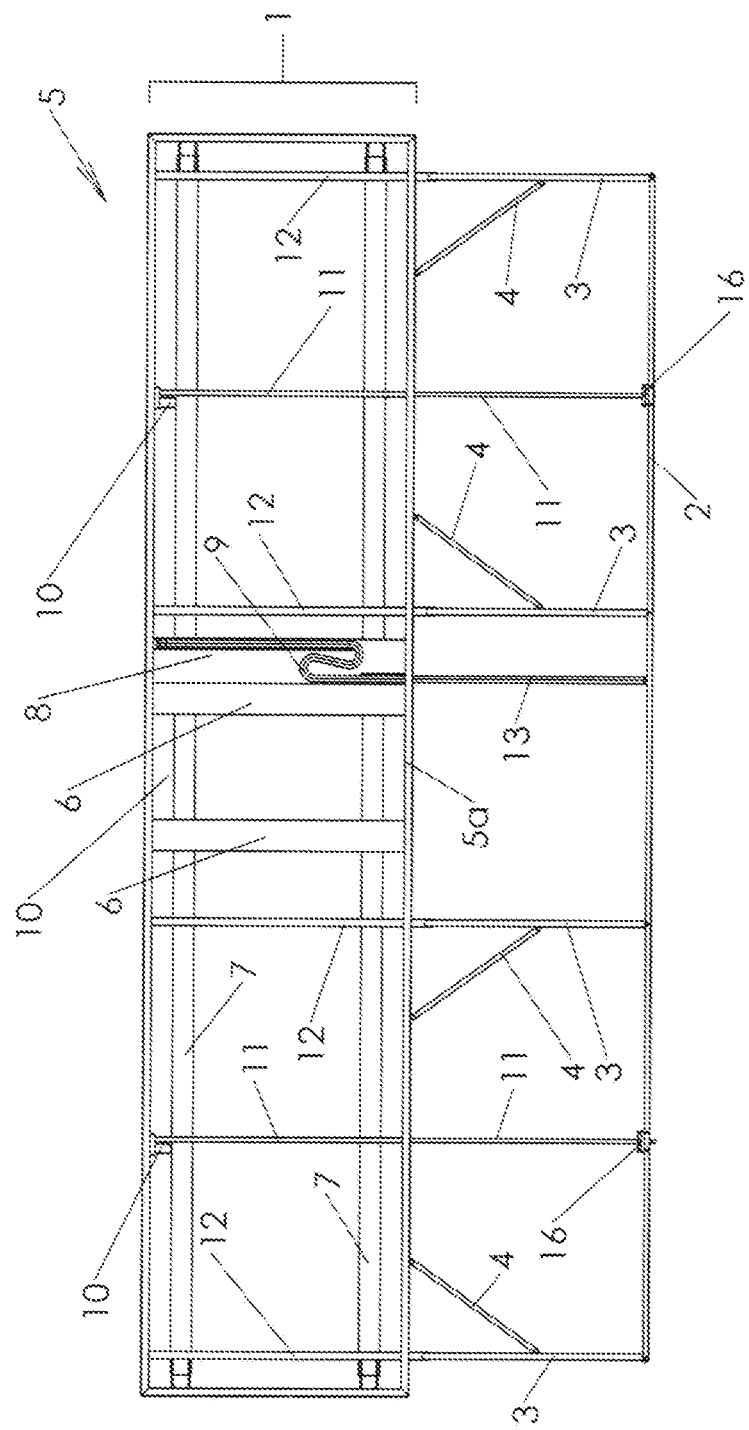
FIG. 39 is a top view of the embodiment shown in FIG. 38.

FIG. 38 is a perspective view of the present invention with four pivot arms and two actuators. FIG. 39 is a top view of the embodiment shown in FIG. 38. In this embodiment, an additional eight feet in length of the rectangular perimeter frame 5 has been gained by adding another pivot arm 4 over the embodiment shown in FIGS. 36 and 37.

Figure 40:
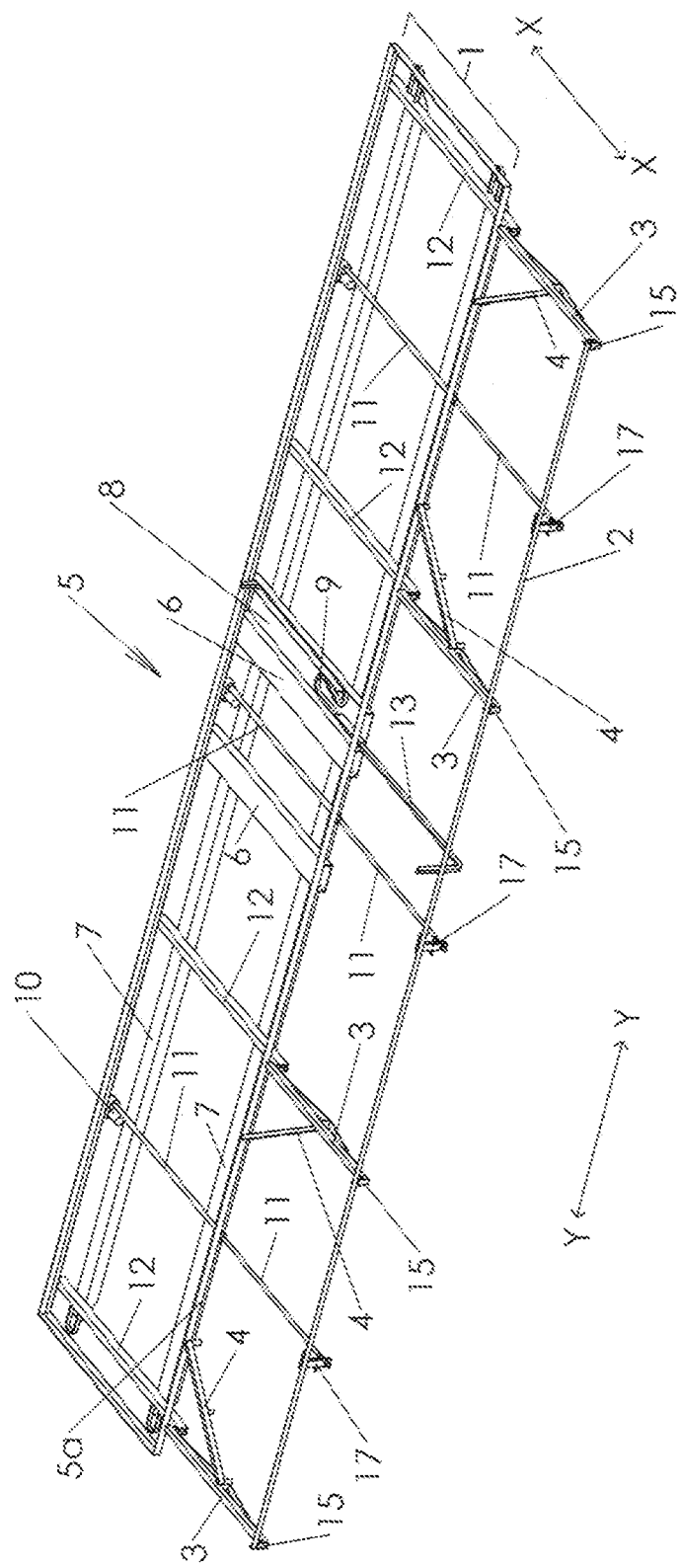
FIG. 40 is a perspective view of the present invention with four pivot arms and three actuators.
Figure 41:
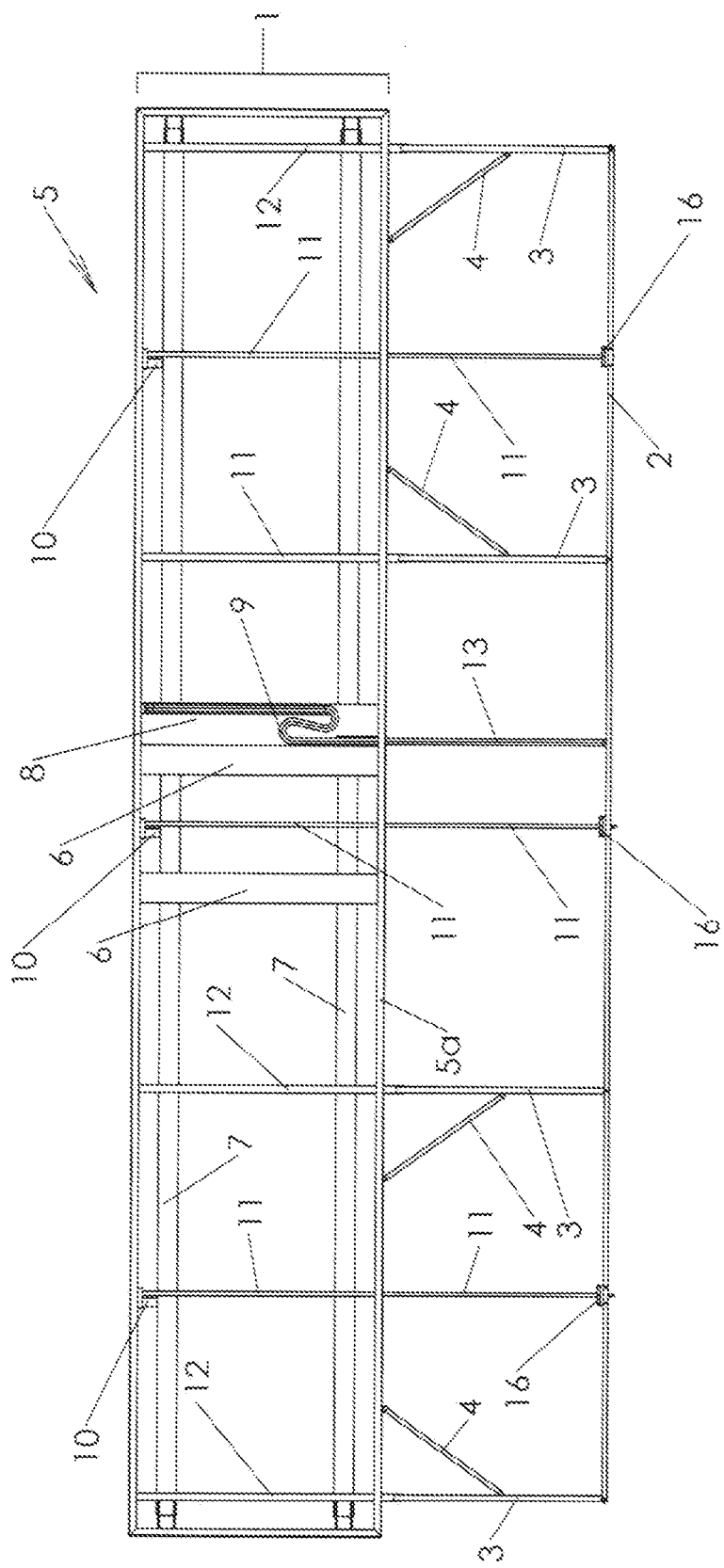
FIG. 41 is a top view of the embodiment shown in FIG. 40.

FIG. 40 is a perspective view of the present invention with four pivot arms and three actuators. FIG. 41 is a top view of the embodiment shown in FIG. 40. In this embodiment, the overall length of the rectangular perimeter frame 5 has been tripled (as compared to the embodiment shown in FIG. 1) by adding two more pivot arms 4 and two more actuators 11.

The actuation system shown in FIGS. 36-41 is the power actuation system described above in connection with FIGS. 1-26; however, these alternate embodiments may also be used with the manual actuation system described in connection with FIGS. 27-29. In the latter embodiments (that is, with the manual actuation system), the motor 10 and actuator 11 shown in FIGS. 36-41 are replaced with a lateral tube 24 and a lateral rectangular conduit 25, as shown in FIGS. 27-29.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A telescoping frame system comprising:
   (a) a non-telescoping frame comprising a longitudinal side, a first attachment arm, a second attachment arm, and a third attachment arm;
   (b) a main arm that is parallel to the longitudinal side of the non-telescoping frame;
   (c) a first pivot arm with a top surface that acts as a rail for a first roller wheel, a second pivot arm with a top surface that acts as a rail for a second roller wheel, and a third pivot arm with a top surface that acts as a rail for a third roller wheel;
   (d) a first brace arm that maintains the first pivot arm at a ninety-degree angle to the longitudinal side of the non-telescoping frame when the first pivot arm is fully extended, a second brace arm that maintains the second pivot arm at a ninety-degree angle to the longitudinal side of the non-telescoping frame when the second pivot arm is fully extended, and a third brace arm that maintains the third pivot arm at a ninety-degree angle to the longitudinal side of the non-telescoping frame when the third pivot arm is fully extended;
   wherein the first pivot arm is pivotally attached to the first attachment arm, the second pivot arm is pivotally attached to the second attachment arm, and the third pivot arm is pivotally attached to the third attachment arm;

wherein the first roller wheel is pivotally attached to a first end of the main arm, the second roller wheel is pivotally attached to a center of the main arm, and the third roller wheel is pivotally attached to a second end of the main arm;

wherein when the roller wheels are moved toward the longitudinal side of the non-telescoping frame, the main arm is also moved toward the longitudinal side of the non-telescoping frame and remains parallel to the longitudinal side of the non-telescoping frame; and wherein when the main arm has been moved so that it is adjacent to the longitudinal side of the non-telescoping frame, the brace arms are removed to allow the pivot arms to pivot, and the pivot arms are pivoted inward and secured to the main arm.

2. A telescoping frame system comprising:
(a) a non-telescoping frame comprising a longitudinal side, a first attachment arm, a second attachment arm, a third attachment arm, and a fourth attachment arm;
(b) a main arm that is parallel to the longitudinal side of the non-telescoping frame;
(c) a first pivot arm with a top surface that acts as a rail for a first roller wheel, a second pivot arm with a top surface that acts as a rail for a second roller wheel, a third pivot arm with a top surface that acts as a rail for a third roller wheel, and a fourth pivot arm with a top surface that acts as a rail for a fourth roller wheel;
(d) a first brace arm that maintains the first pivot arm at a ninety-degree angle to the longitudinal side of the non-telescoping frame when the first pivot arm is fully extended, a second brace arm that maintains the second pivot arm at a ninety-degree angle to the longitudinal side of the non-telescoping frame when the second pivot arm is fully extended, a third brace arm that maintains the third pivot arm at a ninety-degree angle to the longitudinal side of the non-telescoping frame when the third pivot arm is fully extended, and a fourth brace arm that maintains the fourth pivot arm at a ninety-degree angle to the longitudinal side of the non-telescoping frame when the fourth pivot arm is fully extended;

wherein the first pivot arm is pivotally attached to the first attachment arm, the second pivot arm is pivotally attached to the second attachment arm, the third pivot arm is pivotally attached to the third attachment arm, and the fourth pivot arm is pivotally attached to the fourth attachment arm;

wherein the first roller wheel is pivotally attached to a first end of the main arm, the second roller wheel is pivotally attached to the main arm at a point between the first end of the main arm and a second end of the main arm, the third roller wheel is pivotally attached to the main arm at a point between the first end of the main arm and the second end of the main arm, and the fourth roller wheel is pivotally attached to the second end of the main arm;

wherein when the roller wheels are moved toward the longitudinal side of the non-telescoping frame, the main arm is also moved toward the longitudinal side of the non-telescoping frame and remains parallel to the longitudinal side of the non-telescoping frame; and wherein when the main arm has been moved so that it is adjacent to the longitudinal side of the non-telescoping frame, the brace arms are removed to allow the pivot arms to pivot, and the pivot arms are pivoted inward and secured to the main arm.

3. The telescoping frame system of claim 1 or 2, further comprising a power actuation system for moving the main arm toward and away from the longitudinal side of the non-telescoping frame.

4. The telescoping frame system of claim 1 or 2, further comprising a manual actuation system for moving the main arm toward and away from the longitudinal side of the non-telescoping frame.

* * * * *